United States Patent
Zhao et al.

[19]

[11] Patent Number: 5,945,997
[45] Date of Patent: Aug. 31, 1999

[54] BLOCK- AND BAND-ORIENTED TRAVERSAL IN THREE-DIMENSIONAL TRIANGLE RENDERING

[75] Inventors: Randy X. Zhao, Fremont; Dong-Ying Kuo, Pleasanton, both of Calif.

[73] Assignee: S3 Incorporated, Santa Clara, Calif.

[21] Appl. No.: 08/883,536

[22] Filed: Jun. 26, 1997

[51] Int. Cl.$^6$ .......................................................... G06F 3/14
[52] U.S. Cl. ............................................. 345/430; 345/429
[58] Field of Search .................................... 345/418, 419, 345/420, 429, 430, 431

[56] References Cited

U.S. PATENT DOCUMENTS 5,377,320 12/1994 Abi-Ezzi et al. ........................ 345/419
5,574,836 11/1996 Broemmelsiek .......................... 345/427
5,801,714 9/1998 Holt ....................................... 345/420

*Primary Examiner*—Phu K. Nguyen
*Assistant Examiner*—Cliff N. Vo
*Attorney, Agent, or Firm*—Fenwick & West LLP

[57] ABSTRACT

A system and method for traversing and rendering a graphic primitive represented in screen space, employing block- and band-oriented traversal algorithms in texture mapping. Improved performance is achieved through burst-mode texture access and texture caching in connection with a texture map subdivided into squares. Block- and band-oriented traversal facilitates minimization of page breaks and texture cache swap-out. Improved determinism is facilitated by obviating the need for pixel sorting algorithms. Improved re-use of retrieved data segments in burst-mode access is facilitated.

21 Claims, 15 Drawing Sheets

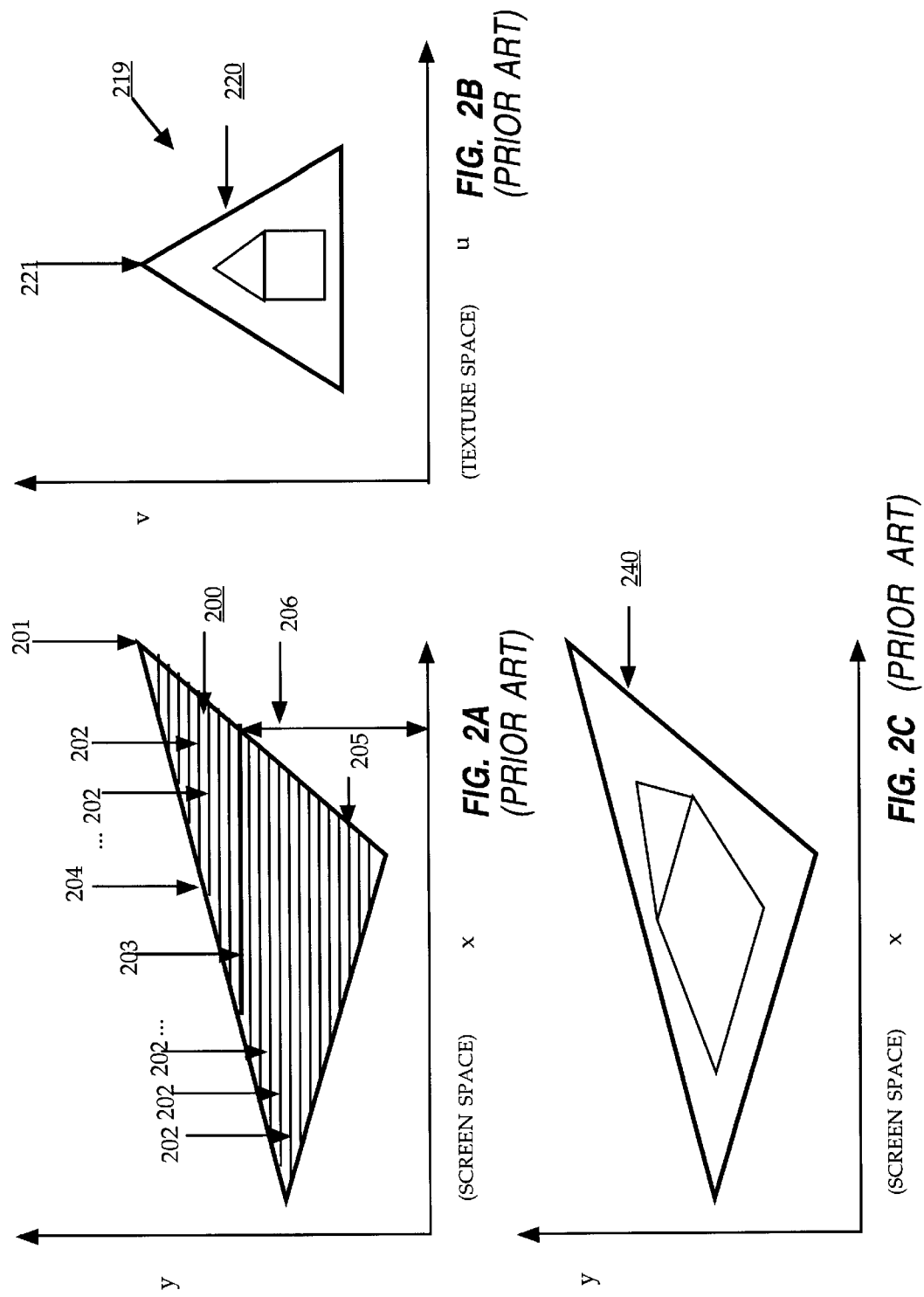

BLOCK- AND BAND-ORIENTED TRAVERSAL IN THREE-DIMENSIONAL TRIANGLE RENDERING

CROSS-REFERENCE TO RELATED APPLICATION

This application is related to U.S. patent application Ser. No. 08/780,787 for "Pixel Reordering for Improved Texture Mapping", by Michael Cox, Dinyar Lahewala, and Don Kuo, filed Jan. 9, 1997, the disclosure of which is incorporated herein by reference.

BACKGROUND OF THE INVENTION

1. Field of the Invention

The present invention relates generally to texture mapping in graphics systems, and more particularly to a system and method of block- and band-oriented traversal to achieve improved bandwidth in such systems.

2. Description of Background Art

Texture mapping is the process of mapping an image onto a surface in a three-dimensional graphics system. This technique is well-known in the art, and is described, for example, in J. Foley et al., *Computer Graphics: Principles and Practice*, 2d. ed., Addison-Wesley, 1990, at 741–44.

Referring now to FIG. 1, there is shown an example of texture mapping according to the prior art. The image to be mapped is referred to as a texture map 101, and its individual elements are referred to as texels. Texture map 101 is typically described in a rectangular coordinate scheme designated (u, v), and is ordinarily stored in some area of conventional memory, such as, for example, a conventional page-mode dynamic random-access memory (DRAM) or other paged memory. In the example of FIG. 1, four pages 110, 111, 112, 113 are shown, each corresponding to a portion of the image area containing a corresponding portion of texture map 101.

Surface 104 in three-dimensional space has its own coordinate system (s, t). In a typical three-dimensional graphics system, surface 104 may be a primitive such as a polygon; many such polygons may be defined in three-space to form a three-dimensional object or scene. Each such polygon would then have its own coordinate system (s, t) similar to the surface 104 indicated in FIG. 1. Based on the orientation of surface 104 in three-space, and on the position and orientation of the "camera", surface 104 is in turn mapped onto a two-dimensional display grid 103 stored in the frame buffer for display by the computer system. The mapping of surface 104 onto display grid 103 is accomplished by matrix transforms that are well-known in the art. Display grid 103 has coordinate system (x, y) and is typically implemented in an area of memory reserved for video display, such as video random-access memory (video RAM) e.g. VRAM or synchronous graphics random-access memory (SGRAM). Display grid 103 contains individual elements known as pixels, represented by distinct memory locations in video RAM.

Coordinates on display grid 103 are often considered to reside in "screen space". Similarly, coordinates in surface 102 are considered to reside in "surface space" and coordinates in texture map 101 are considered to reside in "texture space". The origins for each of the coordinate systems may be placed at any position, although typically the screen-space origin is placed either at bottom-left or top-right.

Each pixel in some region of display grid 103 maps onto a point on surface 104 and in turn to a point in texture map 101. Thus, in the example of FIG. 1, point $A_{xy}$ of display grid 103 maps onto point $A_{st}$ in the coordinates of surface 102 and to point $A_{uv}$ in texture map 101, or a group of points forming a region in texture map 101. Each of the mappings among display grid 103, surface 102, and texture map 101 may be point-to-point, point-to-region, region-to-point, or region-to-region. In conventional implementations of texture mapping systems, the mapping from display grid 103 to surface 104 and in turn to texture map 101 also generates a value d representing the level of detail for the particular texel. Typically, d is a measure of the perceived distance of the point in the texture map, as determined by a z-value for the point in the frame buffer. Points that are perceived to be farther away have a lower level of detail representing decreased resolution. In retrieving texels from texture map 101, d is used to implement a multum in parvo map (MIP map) scheme wherein several texels may be averaged, or otherwise filtered, and mapped onto one pixel of the frame buffer. This filtering may be performed on-the-fly, or filtered pixels may be pre-calculated at several selected resolution levels and stored for later retrieval, resulting in improved performance. The higher the value of d, the lower the level of detail, and the more pixel-filtering is performed. In the limit, the entire texture map may theoretically be reduced to one pixel in the frame buffer.

Conventional rasterization engines draw the image into the frame buffer by the known technique of scan conversion of primitives such as polygons and lines (see, for example, Foley et al.). Scan conversion takes as its input primitives defined in terms of vertices and orientations, and provides as its output a series of pixels to be drawn on the screen. As each pixel is generated by scan conversion, a rasterization engine performs the necessary mapping calculations to determine which texel of texture map 101 corresponds to the pixel. The rasterization engine then issues whatever memory references are required, such as texture fetch, z-fetch, z-writeback, color fetch, color write-back, and the like) to retrieve texel information for writing to the pixel being processed. Thus, memory references are issued in the order generated by the scan conversion. Conventionally, such memory references are stored and managed according to a first-in first-out (FIFO) scheme using a FIFO queue.

It is known that conventional page-mode DRAM components incur access-time penalties when accessing memory locations from different memory pages. For example, in some memory architectures such as SGRAM, an access to an open page requires one cycle, a read from a page not open requires nine cycles, a write to a page not open requires six cycles, and an access to an open page on a different bank requires three cycles. Thus, the above-described scheme of issuing memory references in the order generated by scan conversion may incur such penalties, as the referenced areas of texture map 101 may lie in different pages. In fact, depending on the distortion of the texture boundaries resulting from the particular mapping transformation being employed, references generated in scan conversion order may require repeated page-switching back and forth, also known as "thrashing". Since memory bandwidth is generally the bottleneck in fast generation of three-dimensional images, such repeated page-swapping results in diminished performance.

In addition, many memory systems employ a burst-mode access scheme wherein a shared memory resource is made available for a particular period of time to one process, and is then unavailable to that process while it services other processes. In order to maximize data transfer, it is advantageous to avoid page breaks within a burst. In essence, once a process has access to the shared memory resource, it is efficient for the process to retain access until the desired data segment has been transferred; page breaks may cause access to be shifted to another process, thus diminishing performance further.

Tiling has been found to be useful in improving data transfer in burst-mode access and in reduce page breaks. Referring again to FIG. 1, texture space 101 is shown divided into four areas 110, 111, 112, 113 corresponding to pages in memory. This is an example of a typical tiling scheme wherein each area (or tile) is stored in a page of memory, so that any scanning done within a tile does not cause page breaks. In general, page breaks only occur when scanning of one tile is complete and scanning of another tile begins. Typically, the tiled storage scheme yields an improved traversal path which reduces page breaks as compared with linear traversal.

Tiles and associated pages may be of any size, such as for example 32×32 pixels, for a total of 1024 pixels. With 16-bit pixels, this corresponds to a page size of 2 KB.

Referring now to FIGS. 1A and 1B, there is shown an example of an advantage of a tiled addressing scheme. FIG. 1A shows primitive 120 represented in a linear addressing scheme. Depending on the width of the frame buffer and page size, each scan line 121 may be represented in memory on its own page. For example, with a frame buffer of width 1024 and height 768, if each pixel has a 16-bit width, a 2 KB page holds a single scan line. Thus, each line segment of primitive 120 would be stored on a different page, and up to eight page breaks would be required to render primitive 120.

By contrast, FIG. 1B shows primitive 120 represented in a tiled addressing scheme. If the entire primitive fits within a single tile 122, no page breaks are required to render primitive 120. Even if primitive 120 spans a plurality of tiles, in general fewer page breaks will be required than with the linear addressing scheme of FIG. 1A.

The above-described tiled addressing scheme can be applied to image storage, and may be extended to color buffers and/or z-buffers as well.

Other techniques have also been attempted in the prior art to minimize page breaks. both for linear and tiled access schemes. One example is the use of specialized memory in place of conventional page-mode memory components. See, for example, H. Fuchs and J. Poulton, "Pixel-Planes: A VLSI-Oriented Design for a Raster Graphics Engine," in *VLSI Design* vol. 2., no. 3, 1981; M. Deering et al., "FBRAM: A New Form of Memory Optimized for 3D Graphics," in *Computer Graphics, Proceedings of SIGGRAPH*, 1995; A. Schilling et al., "Texram: A Smart Memory for Texturing," in *IEEE Computer Graphics and Applications*, 1996. Such systems generally improve memory bandwidth by, for example, associating memory directly with processing on an application-specific integrated circuit (ASIC), or by associating logic with memory directly on a DRAM chip. See A. Schilling et al. However, such techniques require highly specialized components that are generally more expensive than conventional page-mode DRAM.

Another attempt to reduce memory bandwidth is described in K. Akeley, "RealityEngine Graphics," in *Computer Graphics Proceedings of SIGGRAPH*, 1993. Akeley describes a system of extreme memory interleaving. This technique requires significantly more memory chips than do conventional memory systems, and consequently is more expensive.

A texture cache may be used to improve access bandwidth to the texture map. However, texture cache hit rate is limited by the locality of the texel references. Poor locality may result in excessive swapping of texels into and out of the texture cache. Conventional scan-line oriented traversal algorithms can result in poor locality, in particular if the texture primitives are oddly shaped. For example, when triangles are used as texture primitives, as is conventional, a very long and narrow triangle may span sufficient length along an x- or y-axis that, by the time the end of a span has been reached, the beginning of the span is no longer cached in the texture cache. Thus, when traversal of the next span begins, the required texels are no longer cached and must be retrieved from main texture memory. In other words, texture cache swap-out based on locality can result in poor hit rate when rendering certain shapes (such as long, narrow triangles).

Texel reordering techniques may be used to improve locality. However, the effectiveness of this approach is limited by the size of the access buffer, and may still fail to solve the texture space locality problem in some situations where the graphics primitives are of irregular shape. Texel reordering may be enhanced and locality improved by traversing two or more scan lines as a group. This approach results in additional complexity, as scheduling issues arise in determining which scan line is to be processed next. Such enhanced texel reordering also requires extensive feedback from the sorting algorithm and may introduce significant hardware design issues resulting from latency and verification.

Though the above-described techniques may be effective in improving rendering efficiency somewhat, unnecessary page-switching still occurs. In particular, burst-mode access to texture space results in unnecessary page thrashing and limited re-use of cached areas due to poor locality of texel references.

Another problem arises when burst-mode access is employed to access texture storage. Burst-mode typically retrieves a data segment having fixed length corresponding to the width of the memory bus (e.g. 64 bits, or 128 bits). Thus, burst-mode access to texture space typically retrieves more data than is immediately needed. Conventional texture storage mechanisms do not adequately cache the unneeded data for later re-use. Thus, additional accesses to this data may be generated where improved locality would have resulted in more effective caching and reuse of the previously retrieved data segment.

What is needed is a system of reducing memory bandwidth by minimizing page-switching in conventional page-mode memory, so as to improve performance of graphic engines for a wide range of client algorithms without substantially increasing the number of components or the overall cost. Specifically, what is needed is a system of improving locality of texel references over existing edge-walking and span-walking traversal techniques, and an improved burst-access scheme for texture space that yields improved re-use of retrieved data.

SUMMARY OF THE INVENTION

In accordance with the present invention, there is provided a system and method of block- and band-oriented traversal in rendering of triangle primitives in a three-dimensional graphics system, in order to minimize page-switching and improve performance of the graphic engine.

The present invention utilizes a texture cache to improve access bandwidth to the texture map. Maximized bandwidth is achieved by using burst-mode access to high-speed cache memory in a scheme providing improved re-use of previously-retrieved data. The texture cache stores texels associated with a particular region for improved access. Locality in texture space is determined by the texture coordinate of each pixel. The texture cache is of finite size; therefore portions of the cache are swapped out when it becomes less likely that they will be imminently accessed. Swap-out is performed according to locality. Thus, texture cache hit rate, which represents the rate at which texels may be accessed by referring to the texture cache, improves when locality of traversal is improved. The present invention is directed toward improving locality of texel references so as to improve the texture cache hit rate, particularly in conjunction with burst-mode access.

Triangle rendering is accomplished by known techniques of edge walking and span walking. Each span of the triangle is determined, and then traversed.

In order to address the above-discussed problems, the present invention employs tiling, an improved texture storage scheme, and a modified traversal technique in order to improve texel reference locality and thereby increase hit rate.

Tiling improves locality of screen-space scanning, as described above. Typically, rendering of primitives in screen space requires fewer page breaks when a tiled addressing scheme is used.

The present invention further employs an improved texture storage scheme whereby texture space is divided into "squares" (which need not actually be squares, but may be rectangular or any other shape) of some fixed dimension, such as 4×4 texels. Each texture square is represented in a contiguous region of memory. Burst-mode access according to defined bit alignment and memory bus width results in retrieval of more data than is required to render the particular line segment being processed. The retrieved data segment is cached for later use. The improved texture storage scheme provides for improved hit rate for the cached data segment by taking advantage of the diagonal orientation of typical line segments in texture space. Specifically, texture squares serve to reduce page breaks when the texture cache is traversed.

Finally, the present invention employs a screen-space traversal scheme providing improved locality of texture accesses. The method of the present invention divides the image into a plurality of blocks or bands in screen space. Each block or band is of fixed width and height, such as for example 8×8 pixels or 16×16 pixels. An image primitive, such as a triangle, may span any number of blocks or bands in screen space. The portion of the primitive lying in any particular block or band can thus be expressed as a plurality of horizontal spans, each span having a maximum width corresponding to the fixed width of the blocks or bands. Specific traversal paths are selected according to geometric characteristics of the primitives being rendered.

A MIP map texture mapping scheme employs an appropriate level of detail (LOD) determined based on available texture space and dimension of the primitive segment being rendered. LOD therefore represents a scaling factor implemented by averaging or otherwise filtering pixel values for a set of pixels in screen space to derive a texel value for a single texel in texture space. Computation speed is improved by restricting LOD scaling factors to powers of two, though this is not a requirement of the present invention.

Each span in screen space corresponds to a line segment in texture space. Given a MIP map texture mapping scheme, the length of the texture space line segment is deterministically limited to be less than or equal to 1.41 w, where w is the fixed dimension of the blocks or bands in screen space.

For a fixed dimension of eight pixels in screen space, the maximum length of a texture space line segment is 1.41× 8=11.28, which rounds up to 12 texels. In some cases where fractional scaling components are resolved by truncation rather than rounding, as will be explained in more detail below a maximum texture space line segment may reach 16 pixels. A texture cache having dimensions of 12×12 (or, when truncation is being used, 16×16) texels will thus be guaranteed to be able to store the full width or height of a block or band subdivision of any primitive, so that traversal of the subdivided primitive will not require swap-out of the texture cache.

Given a fixed maximum dimension of any segment in texture space (12 texels, or 16 texels, in the example given above), a given number of texture cache squares must be available for contiguous access in order to guarantee memory locality. In a best-case situation where the orientation of the segment in texture space is either horizontal or vertical, the number of texture cache squares is determinable by dividing the maximum segment length in texture space by the dimension of the texture cache squares. Thus, in the above example, the 12-texel maximum segment length could be represented by three adjacent 4×4 texel squares if the segment were vertically or horizontally oriented. In a worst-case situation where the segment is oriented at 45 degrees in texture space, a worst-case situation requires a total of 13 squares of 4×4 dimension. Thus, if 13 texture cache squares are provided and available for contiguous access, memory locality is guaranteed for all line segments for squares and bands of eight pixels in screen space.

An additional advantage of the present invention using an eight-pixel wide block or band is that such divisions align naturally with page boundaries and thereby yield good locality in the z-buffer.

BRIEF DESCRIPTION OF THE DRAWINGS

FIG. 2A is a diagram of a triangle primitive in screen space according to the prior art.

FIG. 2B is a diagram of a texture image in texture space according to the prior art.

FIG. 2C is a diagram of a texture-mapped triangle primitive in screen space according to the prior art.

DETAILED DESCRIPTION OF THE INVENTION

Figure 8:
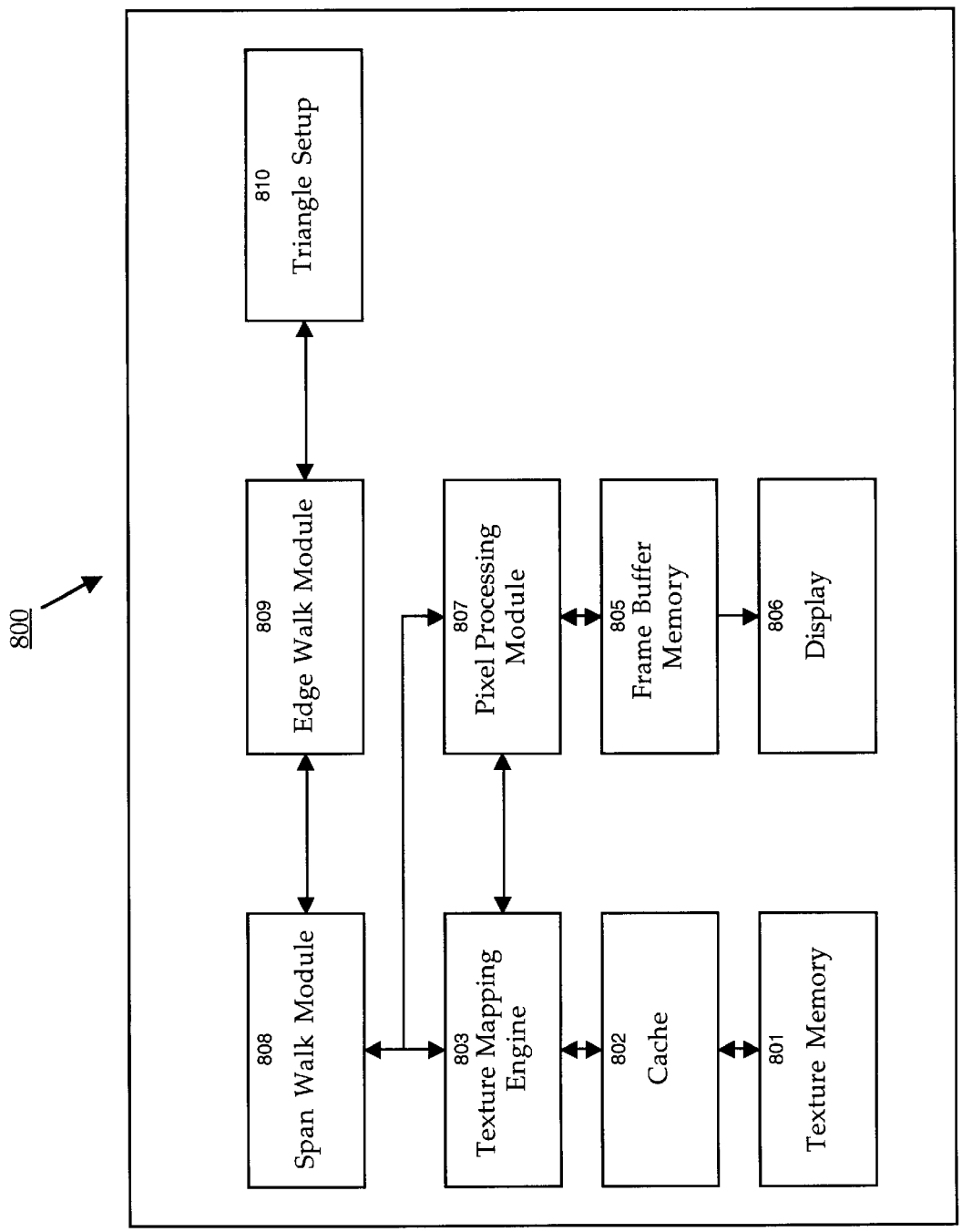
FIG. 8 is a block diagram of a system for practicing the present invention.

Referring now to FIG. 8, there is shown a system 800 for practicing the present invention. Texture memory 801 contains a two-dimensional representation of a texture to be mapped onto primitives. Cache 802 provides temporary storage of portions of texture memory 801 for improved access speed, as will be described in more detail below. Graphic primitives are stored in a primitive storage portion of memory (not shown), and define the size and shape of graphic elements, such as triangles or other polygons, to be displayed. Primitives are processed by triangle setup module 810 and traversed using edge walk module 809 and span walk module 808 to implement the scanning and traversal techniques described below. Texture mapping engine 803 performs the operation of mapping textures stored in texture memory 801 onto primitives. Pixel processing module 807 then performs z-buffering, texture lighting, fogging, alpha blending, and other pixel operations and writes the resulting rendered image to frame buffer memory 805 or other video memory. The image in frame buffer memory 805 is sent to display 806. The present invention relates to the operation of texture mapping engine 803 and its relationships to the other components of FIG. 8.

Referring now to FIG. 2A, there is shown a triangle primitive 200 in screen space to be rendered by accessing a texture map 219 in texture space. Primitive 200 typically represents some element of a graphic image on the display screen 806, and texture map 219 contains some graphic pattern or image 220 that is to be mapped onto primitive 200. Image 220 in texture map 219 may be distorted when mapped onto primitive 200 so as to give the impression of being viewed at an angle in three-dimensional space. For example, in a video game, primitive 200 may represent some portion of a spaceship flying through space, and texture map 219 may contain a graphic image of the markings and other surface features of the spaceship portion. In order to give the impression of three-dimensional action, the spaceship portion represented by primitive 200 may be elongated and otherwise distorted so that it appears to be viewed from an angle in three-dimensional space. Texture image 220, when mapped onto primitive 200, is similarly elongated and distorted in order to preserve and enhance the impression.

Edge- and Span-Walking

Figure 1:
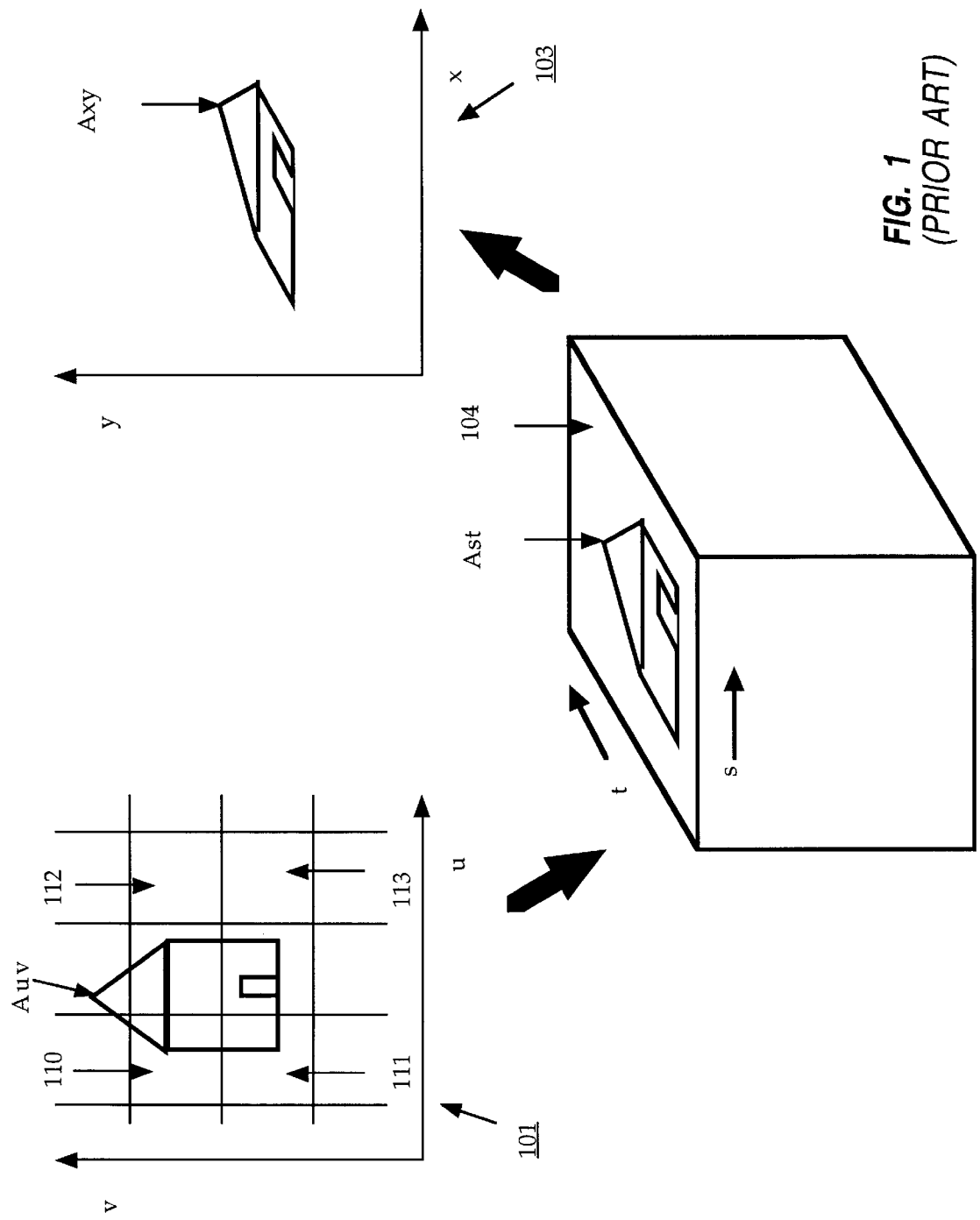
FIG. 1 is a diagram showing texture mapping according to the prior art.
Figure 1A:
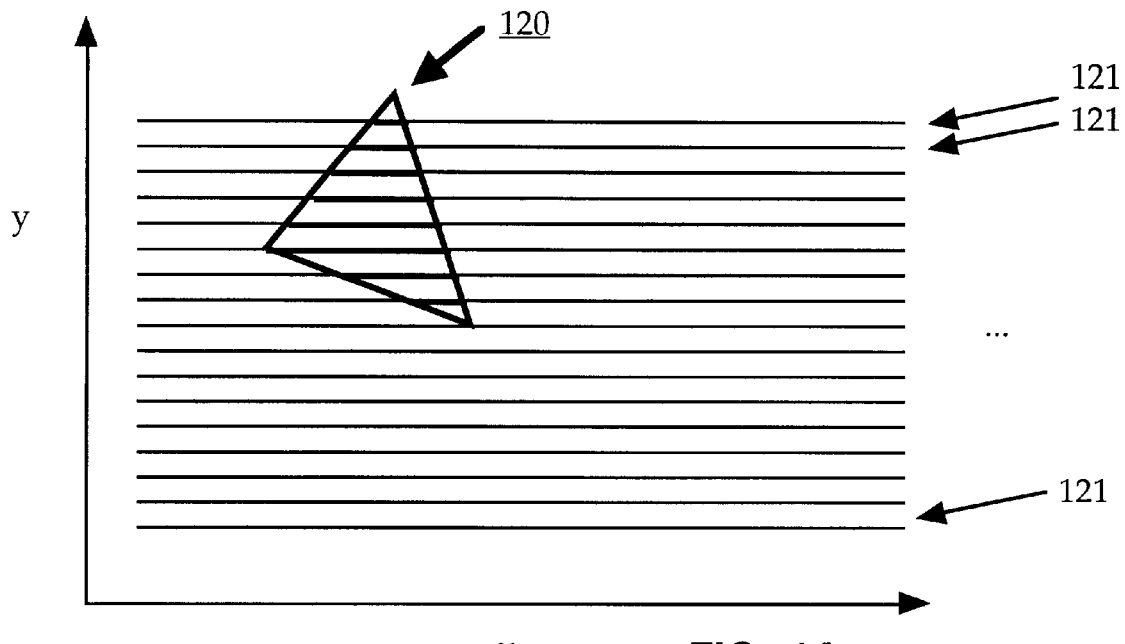
FIG. 1A is a diagram showing a linear addressing scheme according to the prior art.
Figure 1B:
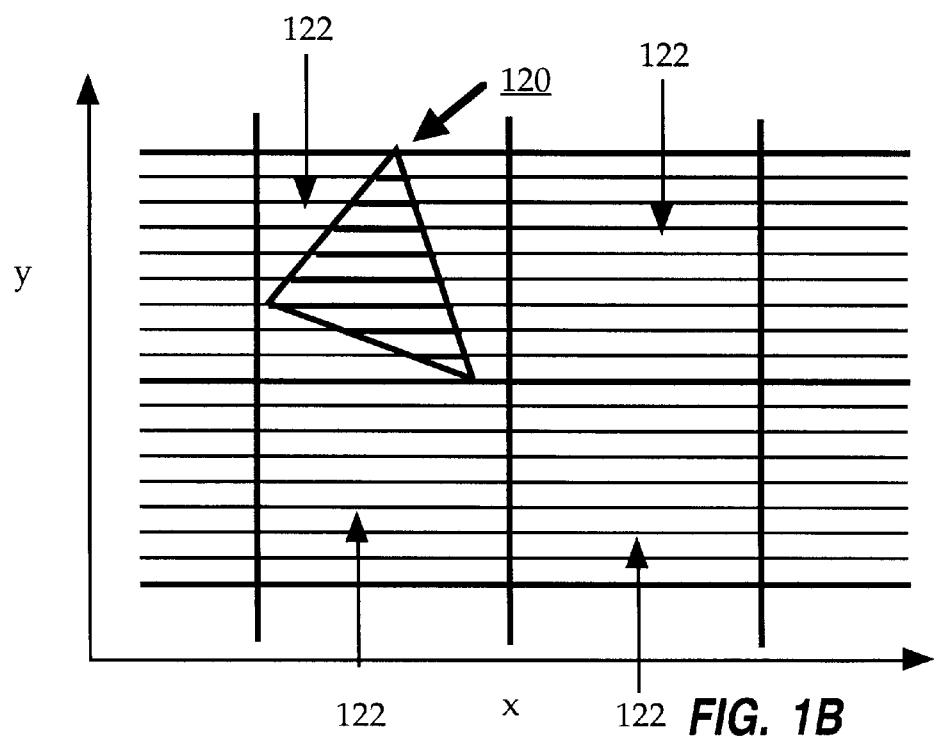
FIG. 1B is a diagram showing a tiled addressing scheme according to the prior art.
Figure 3:
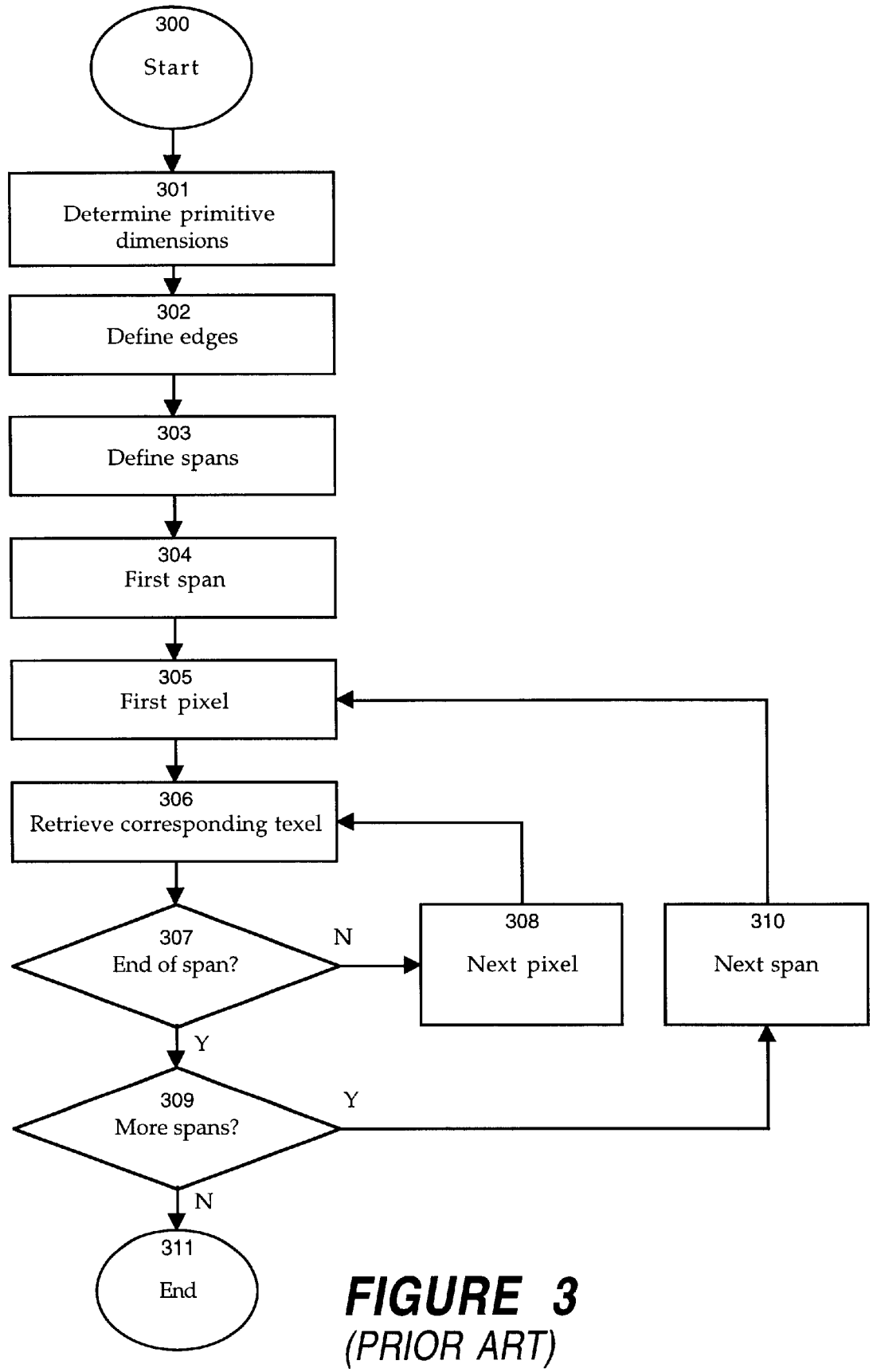
FIG. 3 is a flowchart of a method of edge- and span-walking according to the prior art.

In order to map texture image 220 onto primitive 200, a technique known as edge- and span-walking is typically used. Referring also to FIG. 3, there is shown a flowchart of the process of edge- and span-walking. Once the screen-space primitive 200 has been defined 301, spans 202 of horizontal pixel rows in screen space are defined. Each span has a unique y-value representing the pixel row, or distance from the x-axis. Each span is demarcated by two edges of primitive 200, each of which may be defined by a linear equation. For example, in FIG. 2A, span 203 is defined by its y-value 206 representing the "height" or row-number of the span. The demarcations of the span are defined by the linear equations describing edges 204 and 205 of primitive 200, which may in turn be derived from the three triangle points which define primitive 200. Thus, in order to define spans 202, edges are defined 302 based on the characteristics of primitive 200, and spans 202 are defined 303 based on edges. Each span 202 contains a particular number of pixels, depending on the difference between the demarcating edge coordinates.

Primitive 200 is traversed span-by-span, and for each span, the pixels within the span are processed in left-to-right order. A first span 202 is selected 304, and a first pixel 305 within the selected span 202 is designated. Typically, the first pixel of the first span represents the leftmost pixel of the topmost span, though other span-walking and/or edge-walking schemes may be used, as will be discussed in more detail below in connection with FIGS. 11A through 11D.

Referring now also to FIG. 2B, a texel in texture map 219 corresponding to the selected pixel is then retrieved 306. MIP map texture mapping is used, as is known in the art, so that a plurality of texture map 219 texels may be combined using averaging or some other filtering technique to generate a value for the selected pixels. In this manner, varying levels of detail are supported, so that for very small primitives 200, unnecessary retrieval of superfluous texel data is avoided. In some embodiments, several versions of texture map image 220 may be stored, at varying levels of detail, so that no run-time computation need be done to generate filtered pixel values at a desired level of detail.

For illustrative purposes, in the present discussion of edge- and span-walking it is assumed that no texel filtering takes place. Thus, a single texel is retrieved and its data is rendered for the selected pixel in primitive 200. For example, pixel 201 of primitive 200 may correspond to texel 221 of texture image 220, so that texel 221 would be retrieved and used in rendering pixel 201 in screen space. Other pixels of primitive 200 are processed similarly.

A check is performed 307 to determine whether the end of the current span has been reached. This check may be performed, for example, by comparing the x-coordinate of the currently selected pixel with the demarcating edge 205 of primitive 200. If the end of the span has not yet been reached, span-walking continues by selecting 308 the next pixel in the span and repeating texel retrieval 306. In one embodiment, performance is improved by retrieving and processing each span via burst-mode access, rather than on a pixel-by-pixel basis. Burst-mode access will be discussed in more detail below in connection with FIGS. 9A through 9D.

Texel retrieval 306 for successive texels during span-walking is facilitated by determining a texel walk vector in texture space corresponding to a single pixel movement in screen space. The texel walk vector represents a distance and direction of traversal in texture space that corresponding to a single pixel traversal in the x-direction in screen space. The texel walk vector therefore depends on the relative sizes and orientations of the screen space primitive 200 and the texture map 220. In general, a relatively large primitive 200 such as that shown in FIG. 2A yields a relatively small texel walk vector, as a single pixel traversal in screen space represents less than a one texel traversal in texture space; therefore two or more successive pixels may map to the same texel in the texture image 220. Conversely, a relatively small primitive 200 yields a relatively large texel walk vector, as the texture map is scaled down and individual texels may be skipped.

Once the end of the span has been reached, a check is performed to determine 309 whether more spans 202 exist. This check may be performed, for example, by comparing the y-value of the current span with the y-value characteristics of primitive 200. If additional spans exist, the next span is selected 310 and traversed as described above. If no additional spans exist, the primitive has been fully rendered and is ready for display.

Referring now also to FIG. 2C, there is shown an example of rendered primitive 240 having the same shape as primitive 200 but now containing a pattern generated by mapping texture map image 220 onto primitive 200.

The above-described method of span-walking generally involves processing pixels sequentially, as the horizontal traversal accesses each pixel in order. Storage of pixel data in memory generally follows a left-to-right pattern, with adjacent pixels being stored in adjacent memory locations. Thus, horizontal traversal for span-walking is typically implemented by accessing successive memory locations in screen memory 805. Memory locality is preserved during the span-walking process for individual spans, and page breaks are generally avoided so as to improve performance.

However, when the end of a span is reached and the next span is to be processed, there may be a discontinuity in pixel data memory address retrieval. In other words, the memory location for the last pixel in a given span may not be adjacent to the memory location for the first pixel in the next span. When spans are sufficiently long, the jump from one span to the next may cause a page break and thereby impair performance, as described above.

Block- and Band-Oriented Traversal

Figure 4A:
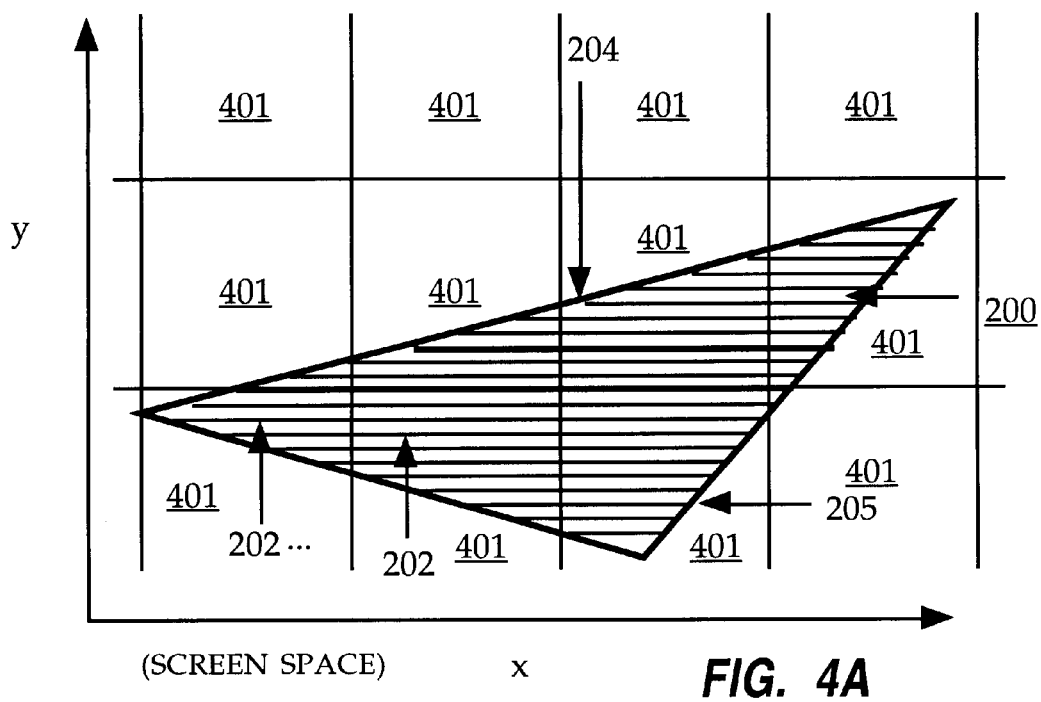
FIG. 4A is a diagram of a triangle primitive in screen space according to the present invention.

Referring now to FIG. 4A, there is shown primitive 200 in screen space, having similar dimensions and shape as shown previously in FIG. 2A. Blocks 401 having fixed x- and y-dimensions are employed to subdivide the screen space and the primitive 200. In one embodiment, the dimensions of blocks 401 are eight pixels by eight pixels, although any suitable dimension may be used.

Figure 4B:
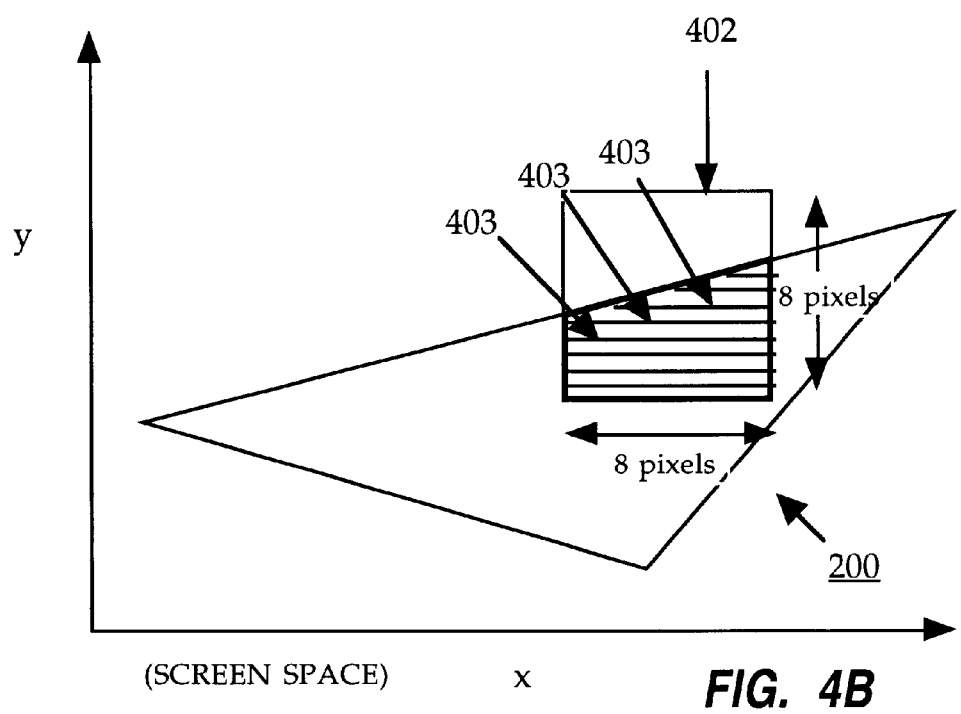
FIG. 4B is a diagram of a block in screen space for traversal according to the present invention.

Span-walking proceeds using a block-by-block traversal scheme so as to improve memory locality and reduce page breaks. Referring now to FIG. 4B, there is shown primitive 200 in screen space with block 402 being indicated for traversal. Block 402 is shown as being eight pixels wide by eight pixels high, for illustrative purposes. Spans 403 are defined as described above, but with the additional delimiter of the block boundaries. The block boundary delimiter ensures that all spans have a maximum length corresponding to the block horizontal dimension. The dimension may be chosen to be sufficiently small so as to avoid page breaks when jumping from one scan line to the next.

Figure 4C:
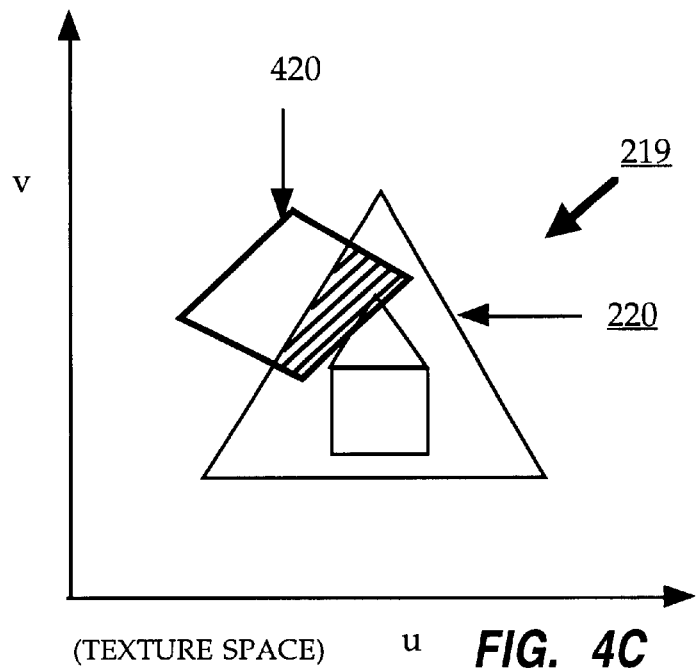
FIG. 4C is a diagram of an area in texture space corresponding to the block of FIG. 4B.
Figure 4D:
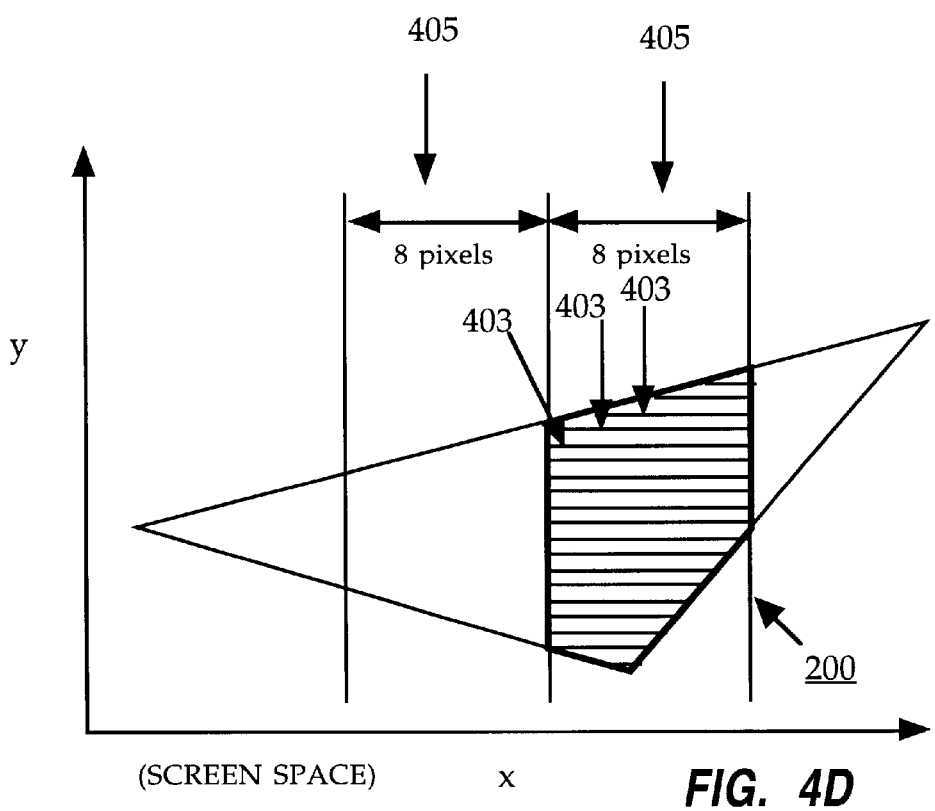
FIG. 4D is a diagram of a band in screen space for traversal according to the present invention.

In an alternative embodiment, bands are used instead of blocks 401, the bands having fixed x-dimension or fixed y-dimension. Referring also to FIG. 4D, there is shown primitive 200 in screen space, having similar dimensions and shape as shown previously in FIG. 2A. Here, bands 405 are defined instead of blocks 401. Band boundaries serve as delimiters for span traversal and ensure a maximum span length corresponding to the band dimension. As with block dimensions, band dimensions may be selected to avoid page breaks when jumping from one scan line to the next.

As will apparent to those skilled in the art, alternative embodiments employing other forms of subdivision, such as horizontal bands or variably shaped blocks, may be used without departing from the spirit or essential characteristics of the present invention.

Figure 11A:
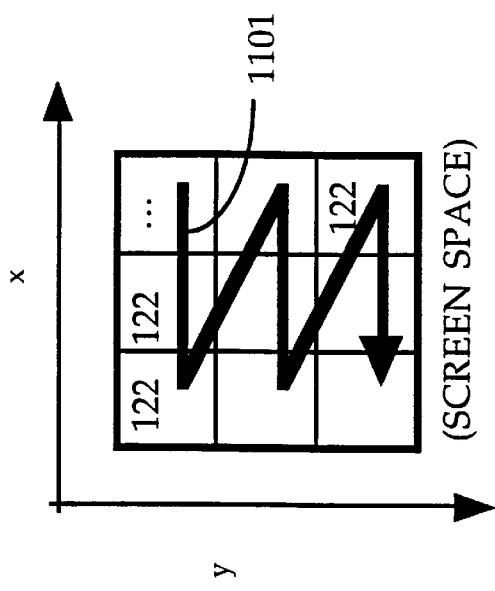
FIGS. 11A through 11D are diagrams of traversal paths in screen space.
Figure 11B:
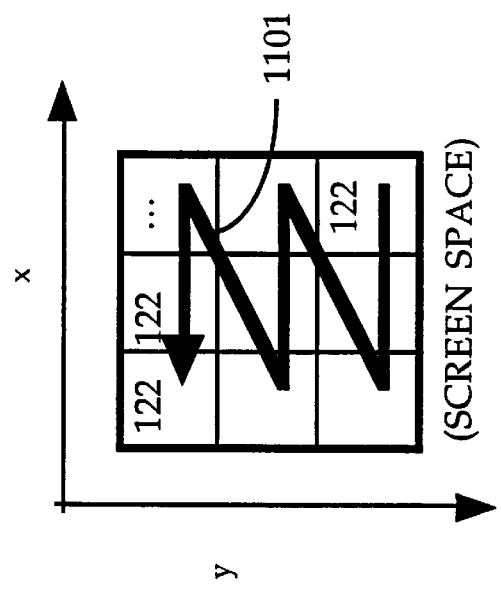
Figure 11C:
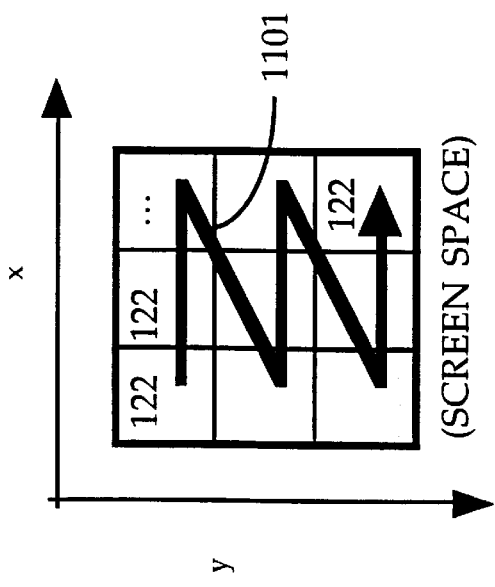
Figure 11D:
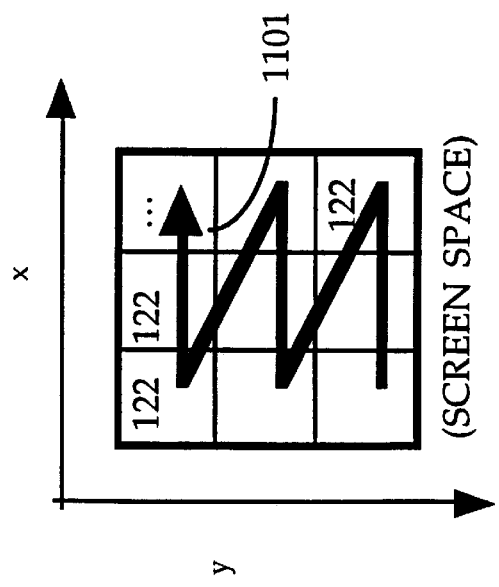

When performing traversal by blocks or bands, the preferred embodiment selects among four different traversal paths. Referring now to FIGS. 11A through 11D, there are shown traversal paths 1101 for traversing tiles 122. FIG. 11A shows a left-to-right, top down path; FIG. 11B shows right-to-left, top-down; FIG. 11C shows left-to-right, bottom up; and FIG. 11D shows right-to-left, bottom-up. Similar traversal paths may be applied to tiled sub-division as well. Traversal paths involving vertical scan lines rather than horizontal scan lines may also be implemented.

Figure 12:
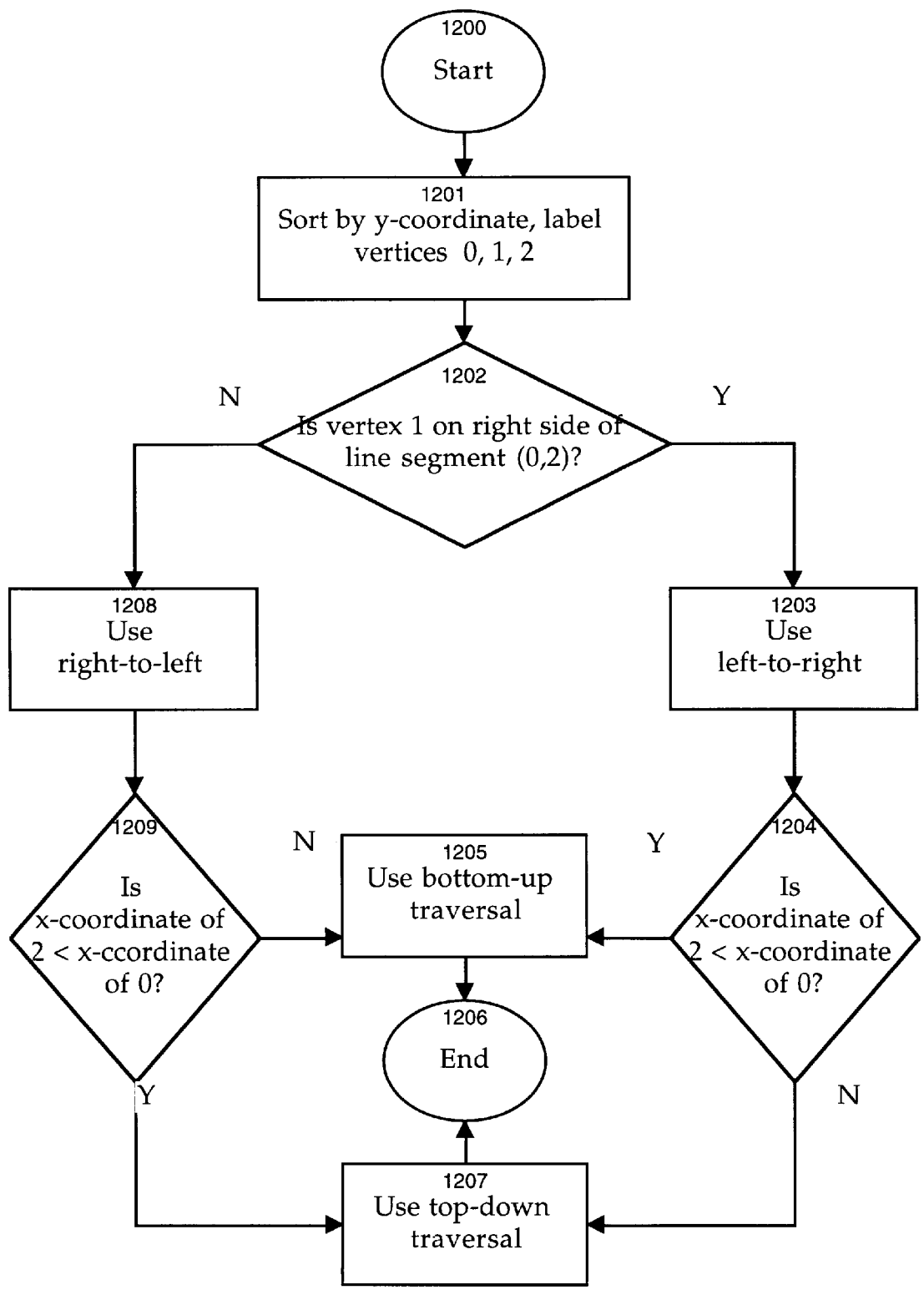
FIG. 12 is a flowchart of a method of selecting a traversal path.

Referring now to FIG. 12, there is shown a method for determining which traversal path to use, according to one embodiment of the present invention. A primitive such as a triangle having three vertices is assumed, each vertex having an x-coordinate and a y-coordinate in screen space. For purposes of this discussion, an origin (x,y=0,0) at the top left corner is assumed.

The three vertices are sorted 1201 by their y-coordinates, and labeled 0, 1, 2. Thus, vertex 1 has a y-coordinate between the y-coordinates for vertices 0 and 1. If vertex 1 lies to the right of the line segment connecting vertices 0 and 2 (step 1202), left-to-right traversal is selected 1203. Once this selection has been made, the x-coordinates of vertices 0 and 2 are compared 1204. If the x-coordinate of vertex 2 is less than the x-coordinate of vertex 0, bottom-up traversal is selected 1205. This is the traversal path shown in FIG. 11C. Otherwise, top-down traversal is selected 1207, which is the path shown in FIG. 11A.

In 1202, if vertex 1 does not lie to the right of the line segment connecting vertices 0 and 2, right-to-left traversal is selected 1208. Once this selection has been made, the x-coordinates of vertices 0 and 2 are compared 1209. If the x-coordinate of vertex 2 is less than the x-coordinate of vertex 0, top-down traversal is selected 1207. This is the traversal path shown in FIG. 11b. Otherwise, bottom-up traversal is selected 1205, which is the path shown in FIG. 11D.

Figure 13:
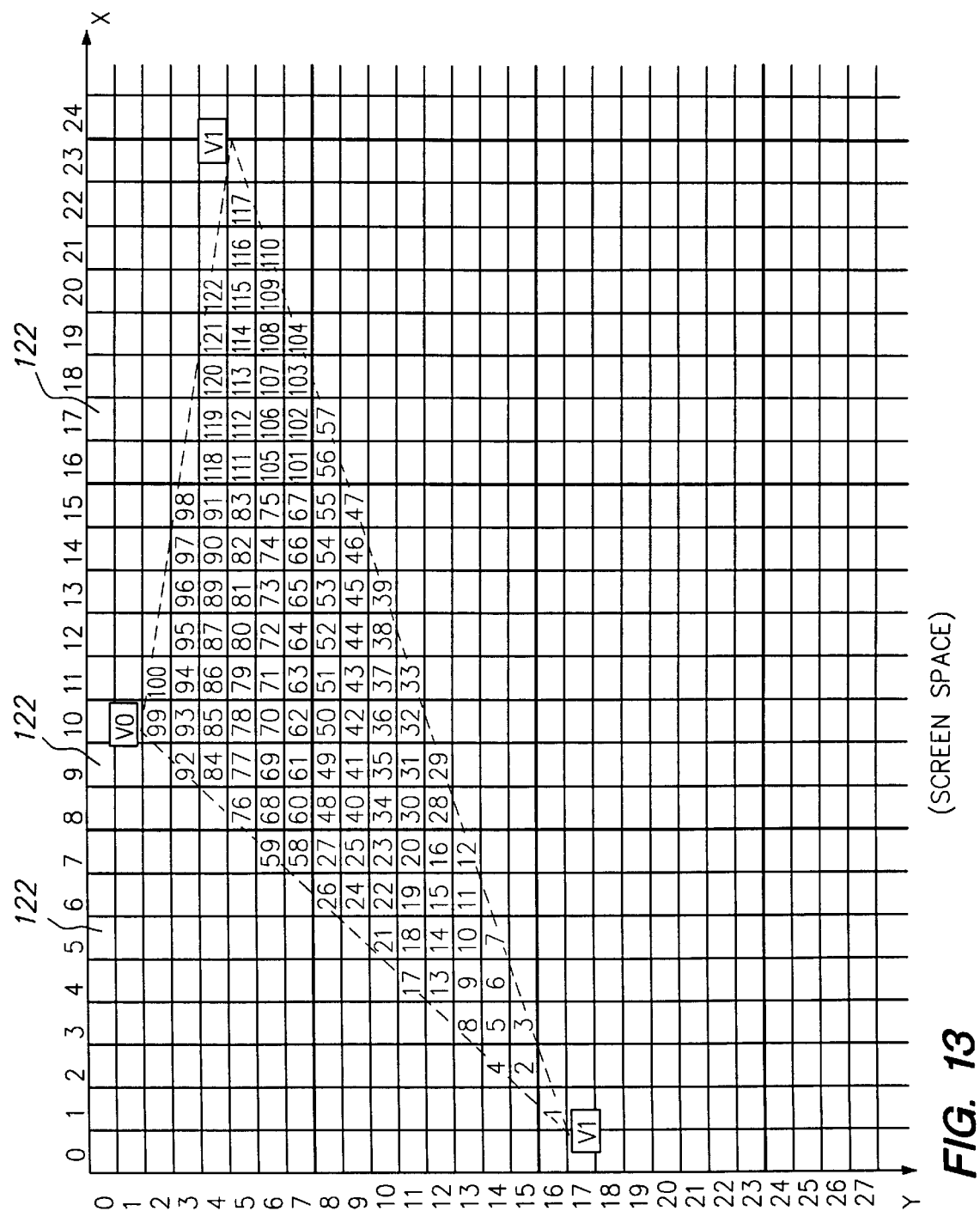
FIG. 13 is a diagram of a traversal path in screen space, including pixel traversal order.

The traversal paths shown in FIGS. 11A to 11D refer to blocks or bands. Within the blocks or bands, individual pixels are traversed. In one embodiment, traversal of individual pixels is performed according to a path analogous to the block traversal path, though other paths may be used. Referring now to FIG. 13, there is shown an example of individual pixel traversal according to a left-to-right, bottom-up traversal path. Rendering order of individual pixels is indicated by numbers 1 through 117.

Referring again to FIG. 4B, block 402 contains a number of scan lines 403 limited by the vertical dimension of block 402. As stated previously, the width of each scan line is limited by the horizontal dimension of block 402. In the example shown, each of these dimensions is eight pixels. Referring also to FIG. 4C, there is shown texture map 219 containing texture image 220 as described above in connection with FIG. 2B. Texture space square 420 represents the region of texture image 220 corresponding to block 402 of FIG. 4B. Therefore, the texels contained in texture space square 420 will be sequentially accessed in the process of traversing block 402. If a texture cache 802 is being implemented, improved locality in texture space results in improved performance in accessing individual texels. It is advantageous for the memory locations containing texel representations for texels in square 420 to be sufficiently proximate to one another so as to avoid page breaks in texture space memory accesses, and to maximize use of texture cache 802. In particular, burst-mode access to texture cache 802 is facilitated, given sufficient memory address locality and contiguity. As is known in the art, burst-mode access provides greatly improved performance in retrieval operations.

In the preferred embodiment, square 402 dimension and texture cache size are selected with texture space locality in mind so as to achieve the above goals. For example, for a square 402 dimension of eight pixels, the maximum span length in screen space is eight pixels. Since scaling may be used when performing texture mapping, an eight-pixel span may correspond to a span of any length in texture space, depending on the scaling factor. In order to remove the uncertainty in maximum texture space span length, and also in order to improve efficiency in texture map scaling, MIP map texture mapping is used.

MIP Map Texture Mapping

Figure 5:
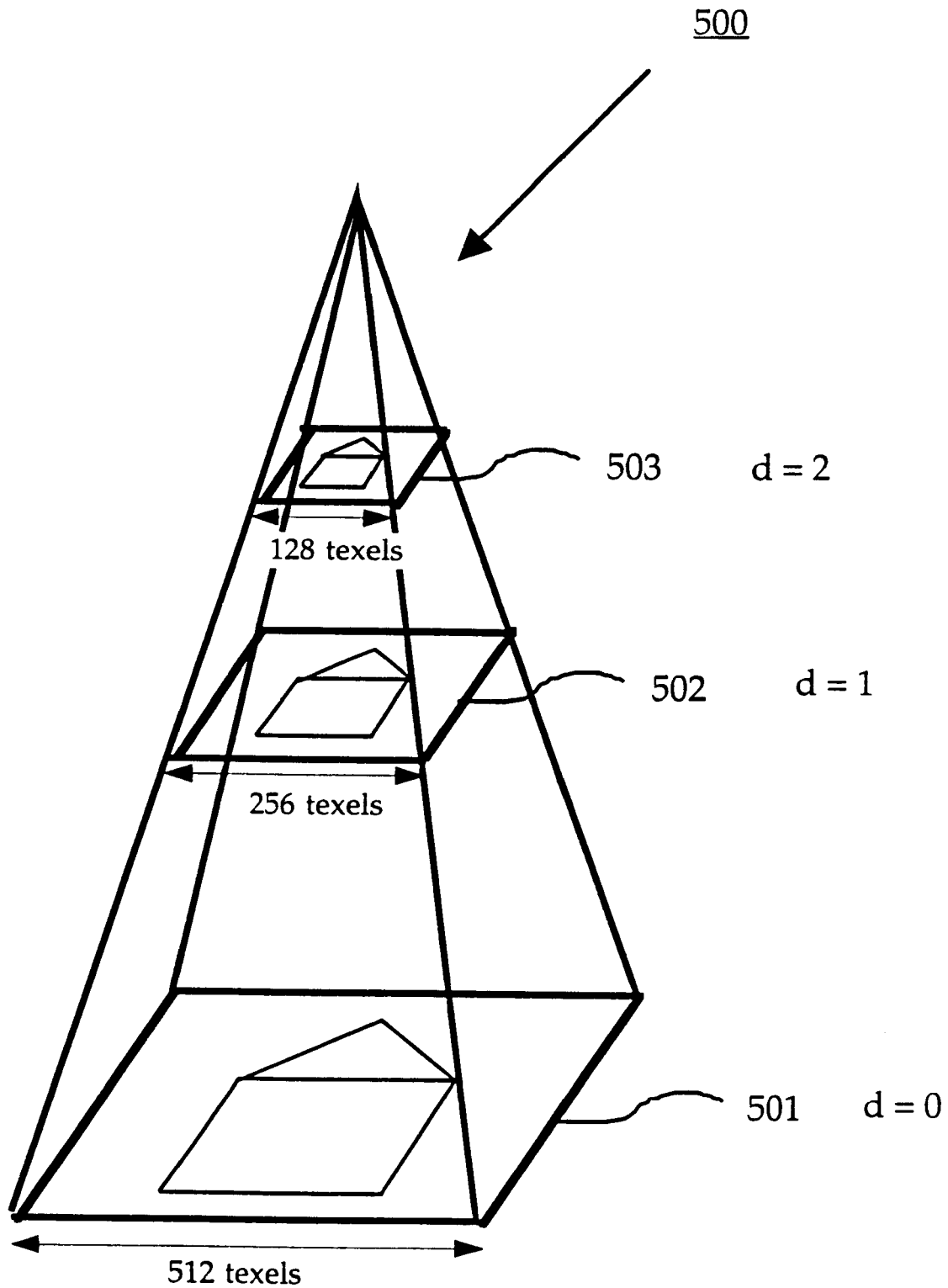
FIG. 5 is a diagram of an example of MIP map texture mapping according to an embodiment of the present invention.

Referring now to FIG. 5, there is shown an example of MIP map texture mapping. Texture map 501 is shown having dimensions of 512 texels by 512 texels. A texture image is stored in texture map 501 at full size. Additional representations 502, 503 of the texture image are also shown, having successively lower levels of detail. Level of detail, represented by a value d, represents a scaling factor to be used in texture mapping. For example, when the texture image is to be rendered on a relatively small primitive, such as one having a greater perceived distance, less detail is needed than when the texture image is to be rendered on a larger primitive. Smaller representations 502, 503 are generated by averaging or otherwise filtering adjacent texels in full-size image 501. For example, a 256-texel square representation 502 is generated from full-size image 501 by filtering texel values for a 2×2 square to derive a texel value for a single texel in the smaller representation. The filtering process is performed for successively larger sets of texels as the level of detail decreases (the 128-texel square filters 4×4 squares, etc.). In general, texel values for N texels in an M×M square are filtered (averaged) to generate one pixel in a smaller representation, where:

$$M = \text{(width of full size image)/(width of smaller image)} \quad \text{(Eq. 1)}$$

and $$N = M^2 \quad \text{(Eq. 2)}$$

In one embodiment, texels are filtered "on-the-fly", as texels are retrieved for rendering. In another embodiment, texel filtering is performed in advance, and several representations at different sizes are stored. Several levels of detail are thus stored in a computation cache, containing the texture image at varying resolutions. Although this technique entails the use of additional storage space for a plurality of texel representations, it improves performance, since the calculation overhead of scaling "on-the-fly" is avoided. Dimensions corresponding to powers of two are preferred for ease of calculation, however this is not required. A square texture image is shown for illustrative purposes, though other shapes such as triangles and rectangles may be used. In particular, a rectangular texture image may be used wherein the scaling factors along the u- and v-axes are not equal, so that in effect a higher compression ratio is performed along one axis than along the other. This may be beneficial when, for example, the particular image demands additional resolution along a horizontal axis than along a vertical axis. However, in the following discussion, uniform scaling factors along both axes are assumed.

The above-described MIP map scaling technique yields greater predictability in maximum span length in texture space. In general, a one-pixel walk in screen space corresponds to an L-pixel walk in texture space, where L is dependent upon the level of detail (d) of the texture space representation to be used. Specifically, L and d are related by the expression $$L = 2^d \quad \text{(Eq. 3)}$$

or, conversely, $$d = \log_2 L \quad \text{(Eq. 4)}$$

In one embodiment, the texture map representation from the MIP map collection of representations is selected based on d. Referring again to FIG. 5, full-size representation 501 is designated as 0, representation 502 is designated as 1, representation 503 is designated as 2, and successively smaller representations are designated as successively higher values of d. Thus, if L is a power of two, d is an integer value, and an appropriate texture map representation can be selected having texel dimension equal to the pixel dimension in screen space.

For example, if L=4, an eight-pixel span in screen space corresponds to 32 texels of a full-size texture map representation, since 4×8=32. However, rather than using a full-size texture map representation, a scaled representation corresponding to the value of $d = \log_2 4 = 2$ will be used. Representation 2 has linear dimension one-quarter the size of the full-size representation. Thus, the eight-pixel screen space span corresponds to a texture space span of eight pixels. In general, with MIP map scaling and L having a value that is a power of two, the pixel dimension of the screen space span always equals the texel dimension of the corresponding texture space span.

If L is not restricted to values that are powers of two, $d = \log_2 L$ may have a fractional component. d may then be represented as $$d = id + fd \quad \text{(Eq. 5)}$$

where id is the integer component and fd is the fractional component. As discussed above texel map representations each have a designation corresponding to the value of d. In one embodiment, if d is not an integer, the texel map representation having a designation closest to the value of d is chosen. Thus, if fd is less than 0.5 the texel map representation having designation of id is used, and if fd is greater than or equal to 0.5, the texel map representation having designation of id+1 is used. The texel map representation most closely approximating the desired level of detail is thus chosen.

If fd is less than 0.5, and texel map representation id is used, the maximum dimension of a texture space span is given by:

$$(\text{maximum screen space span}) \times 2^d / 2^{id} \quad \text{(Eq. 6)}$$

which can be represented as:

$$(\text{maximum screen space span}) \times 2^{(id+fd)} / 2^{id} \quad \text{(Eq. 7)}$$

and which reduces to:

$$(\text{maximum screen space span}) \times 2^{fd} \quad \text{(Eq. 8)}$$

$2^{fd}$ has a maximum value of $2^{0.5} = 1.41$, so that the maximum texture space span is no more than 1.41 times the maximum screen space span.

If fd is greater than or equal to 0.5, and texel map representation id+1 is used, the maximum dimension of a texture space span is given by:

$$\text{(maximum screen space span)} \times 2^d/2^{id+1} \quad \text{(Eq. 9)}$$

which can be represented as:

$$\text{(maximum screen space span)} \times 2^{(id+fd)}/2^{id+1} \quad \text{(Eq. 10)}$$

and which reduces to:

$$\text{(maximum screen space span)} \times 2^{fd-1} \quad \text{(Eq. 11)}$$

$2^{fd-1}$ has a minimum value of $2^{-0.5}=0.71$, so that the maximum texture space span is no less than 0.71 times the maximum screen space span.

Given a MIP map scheme, texture space span is therefore guaranteed to fall between 0.71×(screen space span) and 1.41×(screen space span). With a fixed block width of eight pixels, and thus a maximum screen space span of eight pixels, the texture space span width will never exceed 1.41×8=11.28 texels. Rounding up, the texture space span width has a maximum dimension of 12 texels. Texture cache swap-out can thereby be avoided by providing for 12-texel span widths. In general, the MIP map scheme guarantees that no page breaks or swap-out will occur during traversal of any given block if texture cache 802 permits spans of 1.41 times the screen space block width.

In an alternative embodiment, fractional components are truncated rather than rounded, so that $2^{fd}$ has a maximum value of $2^{1.0}=2.00$. In this case, the maximum texture space span is no more than 2 times the maximum screen space span. Thus, an eight-pixel maximum length in screen space yields a maximum texel length of 16 texels.

In either the rounded or truncated scheme, a discontinuity may be perceived when the value of d changes so that a different representation can be used. In some applications, such as video games where smooth movement is desired, the effect of the discontinuity can be jarring. Accordingly, in yet another embodiment, a tri-linear texture mapping scheme is employed, wherein both of the two nearest representations are averaged (or otherwise filtered) to generate a new representation more closely approximating the d value. Thus, for example, if d=2.9, representations for 2.0 and 3.0 are retrieved and combined using a filtering technique.

For example, four texels of each representation are averaged to generate two texel values, $t_{2.0}$ and $t_{3.0}$. A new value is then generated from $t_{2.0}$ and $t_{3.0}$ using weighted averaging, so that:

$$t_{2.9}=0.1(t_{2.0})+0.9(t_{3.0})$$

or, more generally:

$$t_d=(1-fd)(t_{id})+fd(t_{id+1})$$

The tri-linear mapping scheme provides a more gradual shift from one MIP map representation to the next, and avoids the perceived discontinuity described above.

Texture Map Squares; Burst-Mode Access

In one embodiment, texture map 101 is implemented according to an architecture wherein the map is subdivided into "squares" and texture cache 802 stores texture map 101 segments on a square-by-square basis. The term "square" is used to refer to texture map subdivisions in order to distinguish such subdivisions from tiles or blocks described previously. However, "squares" may actually be of any shape, in particular non-square rectangles.

Figure 6:
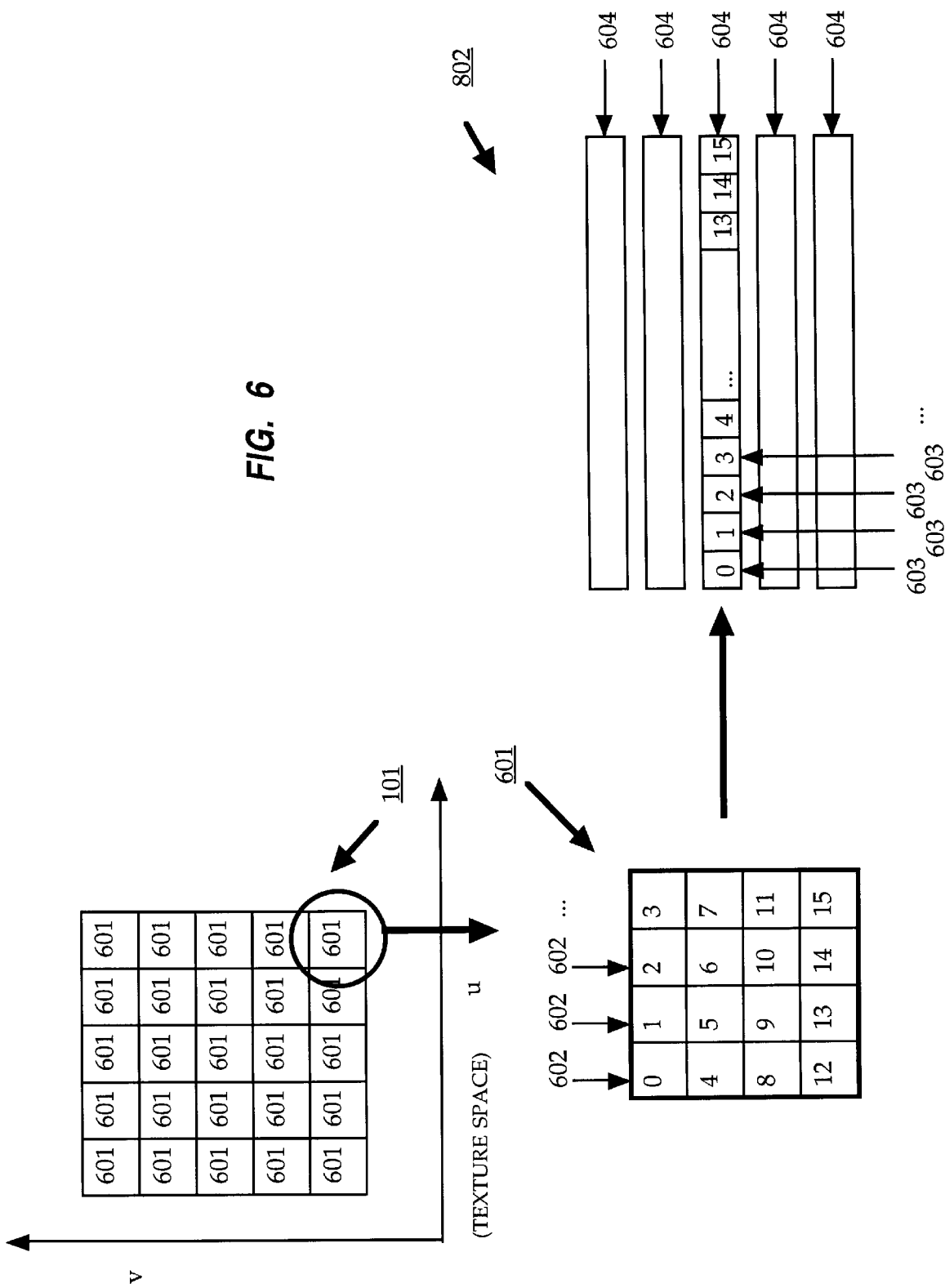
FIG. 6 is a diagram of an implementation of a texture map with squares.

Referring now to FIG. 6, there is shown an implementation of texture map 101 with squares 601. Each square 601 contains a number of texels 602. For illustrative purposes, 16 texels are shown as constituting one square 601 in a 4×4 arrangement, though any number may be used. Texture cache 802 stores portions of texture map 101 on a square-by-square basis by providing a plurality of cache lines 604, each of which is capable of storing data describing one square 601. In the example shown, 16 bits 603 are shown in each cache line 604, corresponding to the 16 texels 602 in a square 601. Texture cache 802 swap-out occurs on a square-by-square basis, so that an entire cache line 604 is replaced with new data when swap-out occurs.

Figure 9A:
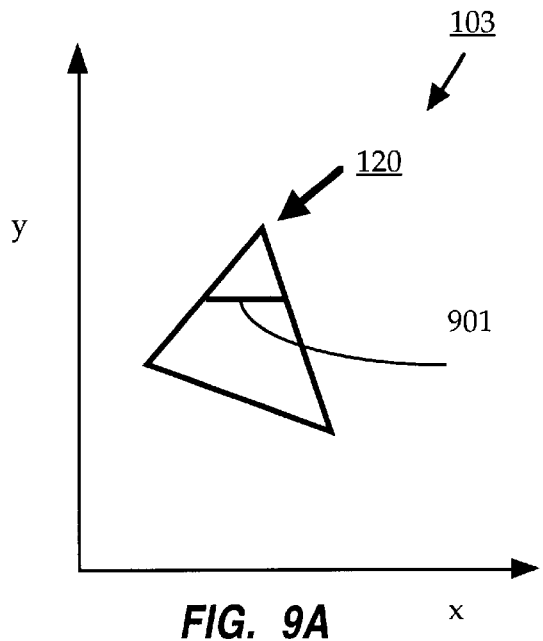
FIG. 9A is a diagram of a triangle primitive in screen space with a component line segment.

The implications of the subdivided texture map 101 implementation in the context of the present invention are as follows. Referring now to FIGS. 9A–9D, there is shown an example of the operation of the subdivided texture map 101 in conjunction with burst-mode access. FIG. 9A shows a simplified example of triangle primitive 120 in screen space 103. A single horizontal line segment 901 is shown, as would be rendered in screen space in the course of drawing primitive 120.

Figure 9B:
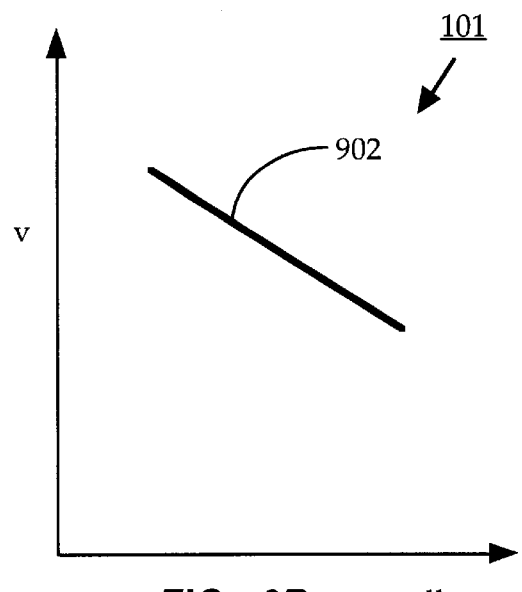
FIG. 9B is a diagram of a line segment in texture space.

Referring now to FIG. 9B, there is shown line segment 902 in texture space 101. Line segment 902 corresponds to line segment 901, according to conventional texture mapping techniques as described above. As is typical in texture-mapping operations, texture space line segment 902 is diagonal although the corresponding screen space line segment 901 is horizontal.

Figure 9C:
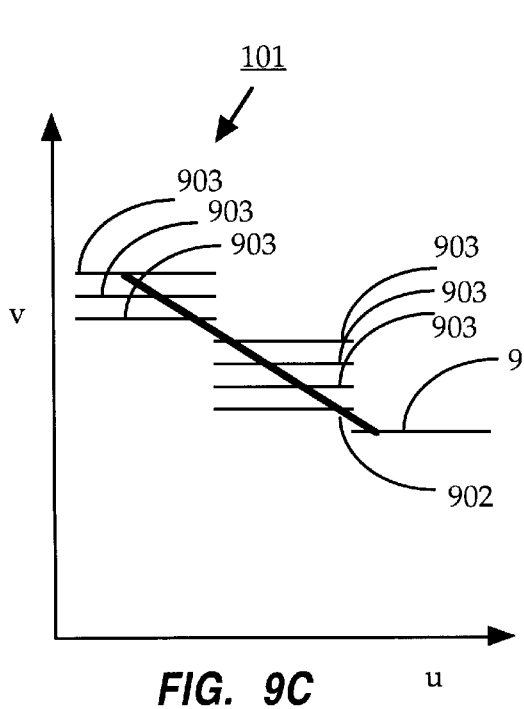
FIG. 9C is a diagram illustrating burst-mode retrieval of a line segment in texture space using a linear addressing scheme.

Referring now to FIG. 9C, there is shown an example of burst-mode access to texture map 101 in the course of performing texture mapping operations. In order to access each texel in line segment 902, a number of successive texture space accesses need to be performed. With a defined fixed-width memory bus (e.g. 64 bits wide) using burst-mode access, each such texture space access retrieves a texture-space line segment 903 corresponding to the defined width. Thus, in the example shown, each line segment 903 represents a byte-aligned, 64-bit contiguous area of texture memory. Burst-mode access typically requires that all texture accesses occur in this manner, so that each access includes a portion of line segment 902 to be rendered, and an area of texture space 101 that is not of any immediate use. The unused portion of each retrieved line segment 903 can be stored in a texture cache for later use. However, the hit rate for the texture cache is relatively low, since succeeding texture accesses typically involve adjacent rows rather than other portions of the same row. Thus, the row-based linear accessing scheme of FIG. 9C yields low hit rates for texture caches, and most of the cached portions end up being discarded rather than reused. Successive accesses to a particular line segment 903 often occur far later, after the texture cache has been flushed, and therefore require reloading without the benefit of the cache.

Figure 9D:
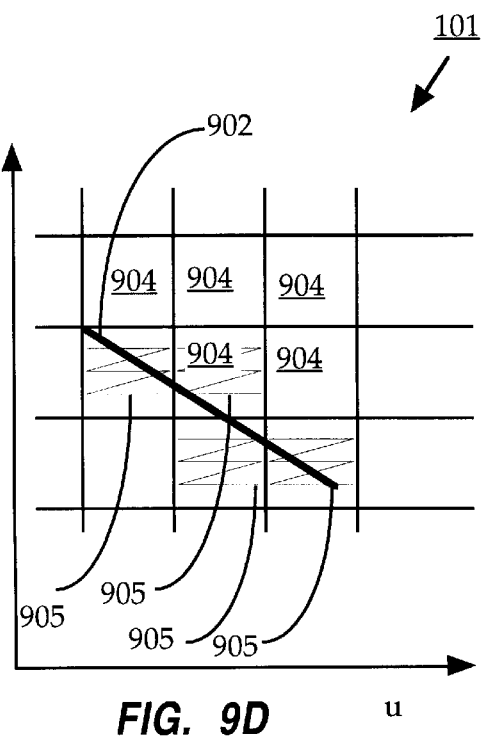
FIG. 9D is a diagram illustrating burst-mode retrieval of a line segment in texture space subdivided into squares.

Referring now to FIG. 9D, there is shown an example of burst-mode access to texture map 101 with a subdivided texture map. Here, the addressing scheme for texture map 101 is based on "squares" 904 rather than horizontal rows of texels. For example, a 64-bit burst might provide a 4×4 square of texels rather than a 16-pixel line segment. Actual sizes of the squares in relation to the bus width depends on bit depth of the texels.

Each square 904 is stored in a cache line of texture cache 802 and is retrieved or discarded as is known for cache storage. A burst-mode access to a particular portion of texture map 101 retrieves a square rather than a horizontal line segment. As can be seen in the example of FIG. 9D, unused portions of the retrieved burst are more efficiently re-utilized for successive portions of line segment 902. In general, since line segments in texture space 101 are typically diagonally oriented, successive portions of line segments often belong within the same square are previously cached portions, thus yielding better locality and hit rate than the linear addressing scheme exemplified in FIG. 9C.

In addition, the subdivided texture space scheme facilitates the use of fewer texture cache lines without sacrificing hit rate. Each texture cache line may be larger, since the square subdivision arrangement yields improved hit rates. The use of fewer cache lines improves performance by reducing the number of comparisons needed when maintaining the cache.

Figure 7:
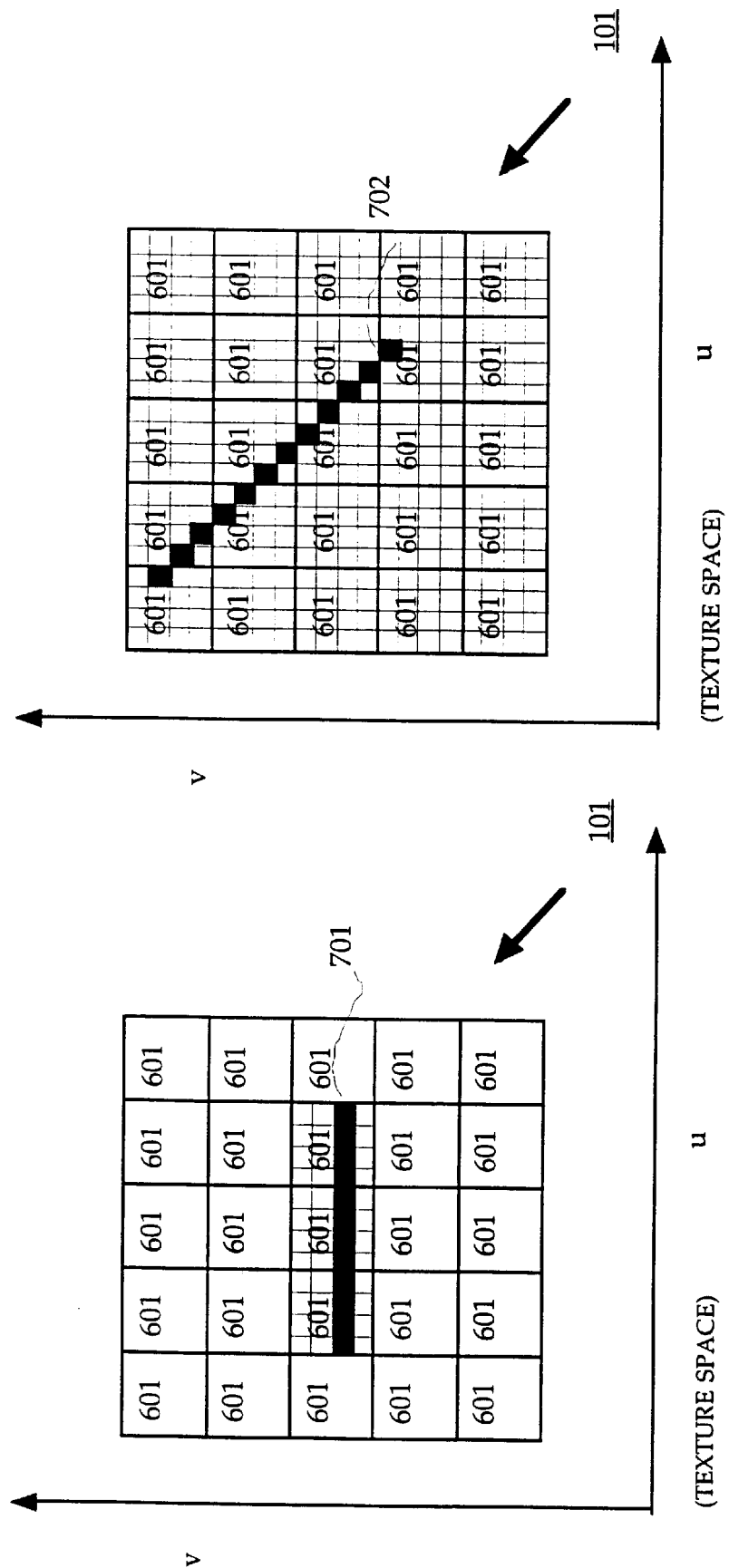
FIGS. 7A and 7B are diagrams of a line segment in texture space.

Referring now to FIG. 7A, there is shown an example of texture map 101 with squares 601 each containing 16 texels in a 4×4 arrangement. As discussed above, an eight-pixel line segment in screen space corresponds to a maximum 12-texel texture space segment. Thus, in order to guarantee that no texture cache swap-out occurs, texture cache 802 is preferably of sufficient size to store a 12-texel line segment. FIG. 7A shows a 12-texel line segment 701 oriented and situated so that the line segment is contained in three texel squares 601. Thus, in such a situation, three cache lines 604 are required to store all texels needed for mapping the 12-texel line segment.

In other situations, however, three cache lines 604 may not be sufficient for a 12-texel line segment. For example, referring now to FIG. 7B, line segment 702 is 12 texels in length, but is now oriented at a 45-degree angle, so that it spans 7 texel squares 601. Thus, in such a situation, 7 cache lines 604 are required to store all texels needed for mapping the 12-texel line segment.

Figure 10:
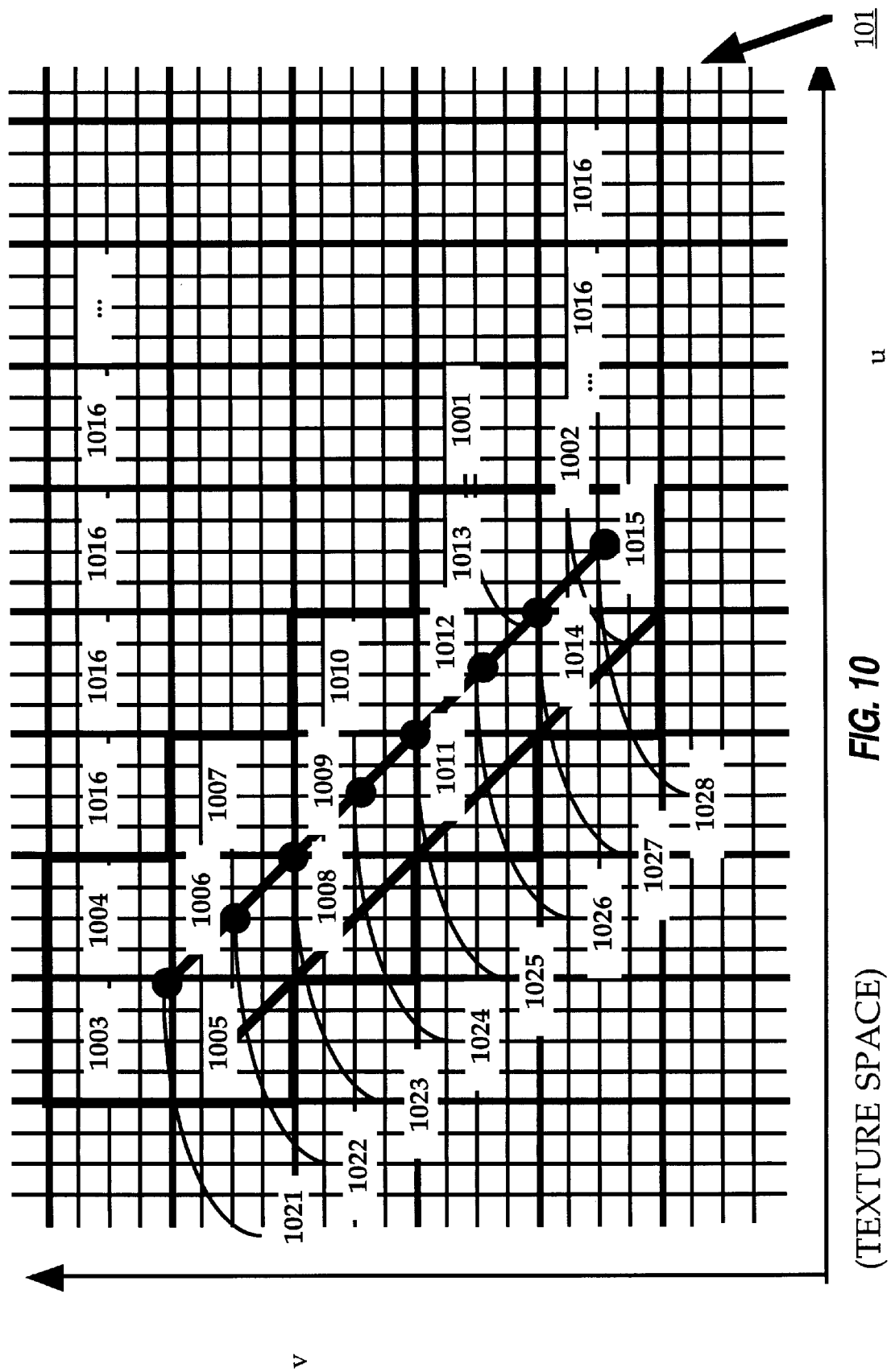
FIG. 10 is a detailed diagram showing an example of a line segment in texture space.

Referring now to FIG. 10, there is shown a detailed example of a worst-case texture map situation, wherein an eight-pixel walk in screen space maps onto texture space. Line segment 1001 is shown containing eight dots 1021, 1022, . . . , 1028 representing an eight-pixel span in screen space. As discussed above, a MIP map scheme employing truncated fractional components yields a maximum texture space walk of two texels for every one-pixel walk in screen space. Thus, there is a two-texel spacing between dots 1021, 1022, . . . , 1028 in FIG. 10. Line 1001 is oriented at a 45-degree angle, and has an endpoint at the intersection of four texel squares 1003, 1004, 1005, 1006, representing a worst-case situation. The value of dot 1021 is determined by filtering the four adjacent texels, which each reside in a different texel square. Similarly, values for each dot 1022, 1023, . . . , 1028 are determined by filtering four adjacent texels to the corresponding dot. It can be seen, therefore, that texel squares 1003, 1004, 1005, . . . , 1015 are needed to determine values for all eight dots in line segment 1001. This represents a total of 13 texel squares for this worst-case situation.

For illustrative purposes, a second line segment 1002 is shown, representing an adjacent scan line. It can be seen from this example that line segment 1002 re-uses seven texel squares 1005, 1006, 1008, 1009, 1011, 1012, and 1014, and requires access to five new texel squares. Re-use is therefore significantly improved over conventional line-based texture cache schemes.

In general, in a worst-case situation, if truncation is used instead of rounding, the maximum number of texel squares is 13. In one embodiment of the present invention, at least 13 cache lines 604 are provided for an eight-pixel block size in screen space to ensure that texture swap-out will not occur. Often, 16 cache lines are provided for ease of addressing.

The above examples are merely illustrative of sample embodiments. Other screen block sizes, texel square sizes, and cache line lengths could be used without departing from the essential characteristics of the present invention. In addition, in an alternative embodiment, a non-tiled texture map is used so that texture cache 802 operates on a texel-by-texel, rather than on a square-by-square, basis, and the above-stated implementation details may be inapplicable.

Latency issues in connection with implementing the present invention are dealt with in conventional manner using a FIFO queue, as described in related application Ser. No. 08/780,787. In one embodiment, texture cache 802 has sufficient FIFO depth to handle expected latency of operation.

To summarize, then, the subdivided texture space scheme of the present invention yields, for each burst access, a square (or other rectangular) region rather than a one-dimensional line segment, thus providing improved texture hit rate and re-utilization, as well as facilitating the use of fewer cache lines.

As described previously, one embodiment of the present invention uses a MIP map texture mapping scheme which limits the length of texture space line segments to a maximum of 1.41 w, where w is the maximum length of line segments in screen space. This limitation, when combined with the subdivided texture space architecture described herein, provides guaranteed locality if a texture cache of sufficient size is available. In particular, MIP map texture mapping guarantees that no more than four adjacent texels (in a 2×2 grid) are required to generate a filtered pixel value for screen space. With the improved traversal scheme described previously, the absolute length of a line segment in texture space can be limited so as to guarantee texture cache hit rate and performance at a given level.

Additional Advantages

As will be recognized by those skilled in the art, fixed-dimension pixel blocks as used in the present invention provide additional advantages in certain graphic rendering schemes. Specifically, in some graphics systems, a z-buffer is used to implement a visible-surface algorithm for rendering of multiple overlapping objects in three-dimensional space, as is known in the art. See, for example, J. Foley et al., at 668–72. Z-buffer access preferably occurs in a burst mode for improved performance, wherein each cache line 604 is retrieved in a single burst, such as may be implemented in a ViRGE-2 graphics engine with four quadwords per cache line 604. As discussed previously, the texel square scheme of the present invention provides improved performance in burst-mode accessing schemes. Since most memory architectures utilize a burst mode wherein transmissions and retrievals occur along natural memory boundaries aligned with a power of two, the eight-pixel block dimension described as an example herein provides the additional benefit of facilitating high-speed z-buffer requests. Z-buffer requests in burst mode can be described in terms of quadwords (64-bit units corresponding to 8×8 pixel blocks). Similar advantages can be realized using any other power of two in conjunction with similarly aligned memory segments and burst-mode access.

In one embodiment used in connection with tiled z-buffer and tiled destination, block dimension is chosen so that the z-buffer and destination tile dimension is an even multiple of the block dimension both horizontally and vertically. This minimizes page breaks when accessing the z-buffer and destination for each block, with a maximum of one page break per block.

Another advantage of the present invention is that pixel order out of the texture mapping is very well aligned with destination. In ViRGE-2, the block boundary is aligned on quadword boundaries. This makes quadword organization into a destination FIFO easy and straightforward.

From the above description, it will be apparent that the invention disclosed herein provides a novel and advantageous system and method of block- and band-oriented traversal-in graphics systems to improve bandwidth and performance. The foregoing discussion discloses and describes merely exemplary methods and embodiments of the present invention. As will be understood by those familiar with the art, the invention may be embodied in other specific forms without departing from the spirit or essential characteristics thereof. In particular, other dimensions and architectures for screen and texture subdivision may be employed, other primitive types, and other origin positions and orientations may be used. Accordingly, the disclosure of the present invention and example figures are intended to be illustrative, but not limiting, of the scope of the invention, which is set forth in the following claims.

What is claimed is:

1. In a graphics system, a computer-implemented method of traversing and rendering a graphic primitive represented in screen space, comprising the steps of:
   a) determining a block dimension;
   b) subdividing the screen space according to the block dimension to define a plurality of blocks;
   c) for each block containing at least a portion of the graphic primitive:
      c.1) defining a plurality of spans within the block, the spans collectively providing a representation of the portion of the graphic primitive corresponding to the block; and
      c.2) performing a texture mapping operation on each defined span.

2. The method of claim 1, wherein c.1) is performed using edge- and span-walking traversal methods.

3. The method of claim 1, wherein c.2) comprises:
   c.2.1) for each defined span, determining a corresponding texture space line segment in a texture map; and
   c.2.2) retrieving data from the texture map representing the texture space line segment.

4. The method of claim 3, wherein c.2) further comprises:
   c.2.3) storing the retrieved data in a texture cache, wherein the texture cache is of sufficient dimension to store a texture space line segment having a maximum length determined based on the block dimension; and wherein c.2.2) further comprises selectively retrieving data from the texture cache.

5. The method of claim 4, wherein c.2.2) comprises retrieving data from the texture map using burst-mode access.

6. The method of claim 4, wherein the texture map is subdivided into a plurality of texture map divisions, and wherein c.2.2) comprises retrieving data from the texture map using burst-mode access to retrieve data corresponding to a selected texture map division.

7. The method of claim 6, wherein each texture map division is a rectangle.

8. The method of claim 6, wherein each texture map division is a square.

9. The method of claim 1, wherein c.2) comprises performing a multum in parvo map texture mapping operation.

10. The method of claim 9, wherein c.2) comprises:
    c.2.1) determining an appropriate scaling factor responsive to at least one of available texture space and dimension of the defined span;
    c.2.2) selecting a texture map representation from a plurality of texture map representations, responsive to the determined scaling factor; and
    c.2.3) retrieving data from the selected texture map representation.

11. The method of claim 10, wherein c.2.2) comprises:
    c.2.2.1) determining a logarithm of the scaling factor;
    c.2.2.2) responsive to the value of the logarithm containing a fractional component, rounding the value of the logarithm to the nearest integer value; and
    c.2.2.3) selecting a texture map representation corresponding to the value of the logarithm.

12. The method of claim 10, wherein c.2.2) comprises:
    c.2.2.1) determining a logarithm of the scaling factor;
    c.2.2.2) responsive to the value of the logarithm containing a fractional component, truncating the value of the logarithm to the next lower integer value; and
    c.2.2.3) selecting a texture map representation corresponding to the value of the logarithm.

13. The method of claim 10, wherein c.2.2) comprises:
    c.2.2.1) determining a logarithm of the scaling factor;
    c.2.2.2) responsive to the value of the logarithm containing a fractional component, performing the steps of:
       c.2.2.2.1) retrieving two texture map representations having integer values approximating the value of the logarithm;
       c.2.2.2.2) obtaining a filtered texture map representation by performing weighted filtering of the two retrieved texture map representations; and
       c.2.2.2.3) selecting the filtered texture map representation; and
    c.2.2.3) responsive to the value of the logarithm not containing a fractional component, selecting a texture map representation corresponding to the value of the logarithm.

14. The method of claim 1, further comprising b.1) defining a traversal path for performing c) on each block containing at least a portion of the graphic primitive.

15. The method of claim 14, wherein b.1) comprises selecting a horizontal traversal order and a vertical traversal order.

16. In a graphics system, a computer-implemented method of traversing and rendering a graphic primitive represented in screen space, comprising the steps of:
    a) defining a plurality of spans, collectively providing a representation of the graphic primitive; and
    b) performing a texture mapping operation on each defined span, by:
       b.1) for each defined span, determining a corresponding texture space line segment in a texture map, the texture map being subdivided into a plurality of texture map divisions;
       b.2) retrieving data from the texture map representing the texture space line segment, using burst-mode access to retrieve data corresponding to a selected texture map division; and
       b3) storing the retrieved data in a texture cache; wherein b.2) further comprises selectively retrieving data from the texture cache.

17. The method of claim 16, wherein each texture map division is a rectangle.

18. The method of claim 16, wherein each texture map division is a square.

19. A system for traversing and rendering a graphic primitive represented in screen space, comprising:

a primitive setup module for defining and storing representations of a graphic primitive;

a frame buffer subdivided according to a block dimension to define a plurality of blocks in screen space;

an edge-walk module, coupled to the primitive setup module, for, for each block containing at least a portion of the graphic primitive, performing edge-walking traversal on the portion of the graphic primitive corresponding to the block, to define a plurality of spans; and a span-walk module, coupled to the edge-walk module, for performing span-walking traversal on a span defined by the edge-walk module; and a texture mapping engine coupled to the span-walk module, for performing a texture mapping operation on the span and writing the result to the frame buffer.

20. The system of claim 19, further comprising a display coupled to the frame buffer for displaying the texture-mapped data.

21. The system of claim 19, further comprising:

a texture memory for storing a texture map; and a texture cache coupled to the texture memory for storing selected sub-divisions of the texture memory;

and wherein the texture mapping engine performs the texture mapping operation using burst-mode access to the texture cache.

* * * * *